United States Patent
Hsueh et al.

(10) Patent No.: US 10,185,128 B2
(45) Date of Patent: Jan. 22, 2019

(54) OPTICAL PHOTOGRAPHING LENS ASSEMBLY, IMAGE CAPTURING UNIT AND ELECTRONIC DEVICE

(71) Applicant: LARGAN Precision Co., Ltd., Taichung (TW)

(72) Inventors: Chun-Che Hsueh, Taichung (TW); Wei-Yu Chen, Taichung (TW); Chun-Shan Chen, Taichung (TW); Hsuan-Chin Huang, Taichung (TW); Kuan-Ting Yeh, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 15 days.

(21) Appl. No.: 15/646,978

(22) Filed: Jul. 11, 2017

(65) Prior Publication Data

US 2018/0239114 A1 Aug. 23, 2018

(30) Foreign Application Priority Data

Feb. 17, 2017 (TW) .............................. 106105394 A

(51) Int. Cl.

| | |
|---|---|
| *G02B 13/18* | (2006.01) |
| *G02B 3/02* | (2006.01) |
| *G02B 9/60* | (2006.01) |
| *G02B 13/00* | (2006.01) |
| *H04N 5/225* | (2006.01) |

(52) U.S. Cl.
CPC .......... *G02B 13/0045* (2013.01); *G02B 9/60* (2013.01); *H04N 5/2254* (2013.01)

(58) Field of Classification Search
CPC .... G02B 13/002; G02B 13/0045; G02B 9/60; G02B 13/04

USPC ................. 359/714, 753, 763, 764
See application file for complete search history.

(56) References Cited

U.S. PATENT DOCUMENTS

| | | | |
|---|---|---|---|
| 8,325,429 B2 | 12/2012 | Tang et al. |
| 8,537,472 B2 | 9/2013 | Tsai et al. |
| 8,611,023 B2 | 12/2013 | Tsai et al. |
| 8,687,293 B2 | 4/2014 | Chen et al. |

(Continued)

FOREIGN PATENT DOCUMENTS

| | | |
|---|---|---|
| CN | 105467555 A | 4/2016 |
| CN | 105807392 A | 7/2016 |
| WO | 2010024198 A1 | 3/2010 |

*Primary Examiner* — William Choi
(74) *Attorney, Agent, or Firm* — Hanley, Flight & Zimmerman, LLC

(57) ABSTRACT

An optical photographing lens assembly includes five lens elements, in order from an object side to an image side: a first lens element, a second lens element, a third lens element, a fourth lens element and a fifth lens element. The first lens element with positive refractive power has a convex object-side surface in a paraxial region thereof. The second lens element with negative refractive power has a convex object-side surface and a concave image-side surface in a paraxial region thereof. The fourth lens element with positive refractive power has a convex image-side surface in a paraxial region thereof. The fifth lens element with negative refractive power has a concave image-side surface in a paraxial region thereof, wherein the image-side surface of the fifth lens element has at least one convex critical point in an off-axial region thereof, and two surfaces of the fifth lens element are both aspheric.

24 Claims, 26 Drawing Sheets

(56) References Cited

U.S. PATENT DOCUMENTS

| | | |
|---|---|---|
| 8,917,458 B2 | 12/2014 | Tsai et al. |
| 2012/0293704 A1 | 11/2012 | Sano et al. |
| 2013/0016261 A1 | 1/2013 | Tanaka et al. |
| 2014/0063619 A1 | 3/2014 | Lai |
| 2014/0078600 A1 | 3/2014 | Shinohara |
| 2014/0184873 A1* | 7/2014 | Chang ............... G02B 9/60 |
| | | 348/335 |
| 2014/0184874 A1 | 7/2014 | Chang et al. |
| 2015/0212389 A1 | 7/2015 | Chen et al. |
| 2015/0253537 A1 | 9/2015 | Ye et al. |
| 2015/0253539 A1 | 9/2015 | Ye et al. |
| 2016/0195695 A1 | 7/2016 | Tang et al. |
| 2016/0202454 A1 | 7/2016 | Chang |
| 2016/0274332 A1 | 9/2016 | Tang et al. |
| 2016/0349483 A1 | 12/2016 | Liu et al. |
| 2016/0349484 A1 | 12/2016 | Liu et al. |
| 2016/0356990 A1 | 12/2016 | Liu et al. |
| 2016/0356991 A1 | 12/2016 | Liu et al. |

* cited by examiner

OPTICAL PHOTOGRAPHING LENS ASSEMBLY, IMAGE CAPTURING UNIT AND ELECTRONIC DEVICE

RELATED APPLICATIONS

This application claims priority to Taiwan Application 106105394, filed Feb. 17, 2017, which is incorporated by reference herein in its entirety.

BACKGROUND

Technical Field

The present disclosure relates to an optical photographing lens assembly, an image capturing unit and an electronic device, more particularly to an optical photographing lens assembly and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

In order to provide better user experience, electronic devices equipped with one or more optical systems have become the mainstream market trend. For various applications, the optical systems are developed with various optical characteristics, and have been widely applied to different kinds of smart electronic devices, such as vehicle devices, image recognition systems, entertainment devices, sport devices and intelligent home assistance systems, for various needs.

In recent years, there is an increasing demand for electronic devices having compact size, and thus the conventional optical systems, especially the optical systems, featuring a large aperture or wide view angle, are difficult to be applied to the electronic devices with high-end specification and compact size. The shortcomings of the conventional wide angle optical system are overly long track lengths, low image quality and too large in size. Therefore, there is a need to develop an optical system featuring compact size, large field of view and high image quality.

SUMMARY

According to one aspect of the present disclosure, an optical photographing lens assembly includes five lens elements. The five lens elements are, in order from an object side to an image side, a first lens element, a second lens element, a third lens element, a fourth lens element and a fifth lens element. The first lens element with positive refractive power has an object-side surface being convex in a paraxial region thereof. The second lens element with negative refractive power has an object-side surface being convex in a paraxial region thereof and an image-side surface being concave in a paraxial region thereof. The fourth lens element with positive refractive power has an image-side surface being convex in a paraxial region thereof. The fifth lens element with negative refractive power has an image-side surface being concave in a paraxial region thereof, wherein the image-side surface of the fifth lens element has at least one convex critical point in an off-axial region thereof, and an object-side surface and the image-side surface of the fifth lens element are both aspheric. When a central thickness of the fourth lens element is CT4, a central thickness of the fifth lens element is CT5, a sum of axial distances between each of the five adjacent lens elements of the optical photographing lens assembly is $\Sigma AT$, a focal length of the optical photographing lens assembly is f, a focal length of the second lens element is f2, and a focal length of the third lens element is f3, the following conditions are satisfied:

$1.40 < CT4/\Sigma AT$;

$|f/f2| + |f/f3| < 0.80$; and $CT4/CT5 < 2.0$.

According to another aspect of the present disclosure, an image capturing unit includes the aforementioned optical photographing lens assembly and an image sensor, wherein the image sensor is disposed on an image surface of the optical photographing lens assembly.

According to still another aspect of the present disclosure, an electronic device includes the aforementioned image capturing unit.

According to yet still another aspect of the present disclosure, an optical photographing lens assembly includes five lens elements. The five lens elements are, in order from an object side to an image side, a first lens element, a second lens element, a third lens element, a fourth lens element and a fifth lens element. The first lens element with positive refractive power has an object-side surface being convex in a paraxial region thereof. The second lens element with negative refractive power has an object-side surface being convex in a paraxial region thereof and an image-side surface being concave in a paraxial region thereof. The fourth lens element with positive refractive power has an image-side surface being convex in a paraxial region thereof. The fifth lens element with negative refractive power has an image-side surface being concave in a paraxial region thereof, wherein the image-side surface of the fifth lens element has at least one convex critical point in an off-axial region thereof, and an object-side surface and the image-side surface of the fifth lens element are both aspheric. When a central thickness of the fourth lens element is CT4, a sum of axial distances between each of the five adjacent lens elements of the optical photographing lens assembly is $\Sigma AT$, a focal length of the optical photographing lens assembly is f, a focal length of the second lens element is f2, a focal length of the third lens element is f3, and a curvature radius of the object-side surface of the fifth lens element is R9, the following conditions are satisfied:

$1.40 < CT4/\Sigma AT$;

$|f/f2| + |f/f3| < 0.55$; and $f/R9 < 1.50$.

BRIEF DESCRIPTION OF THE DRAWINGS

The disclosure can be better understood by reading the following detailed description of the embodiments, with reference made to the accompanying drawings as follows.

DETAILED DESCRIPTION

An optical photographing lens assembly includes five lens elements. The five lens elements are, in order from an object side to an image side, a first lens element, a second lens element, a third lens element, a fourth lens element and a fifth lens element.

Figure 25:
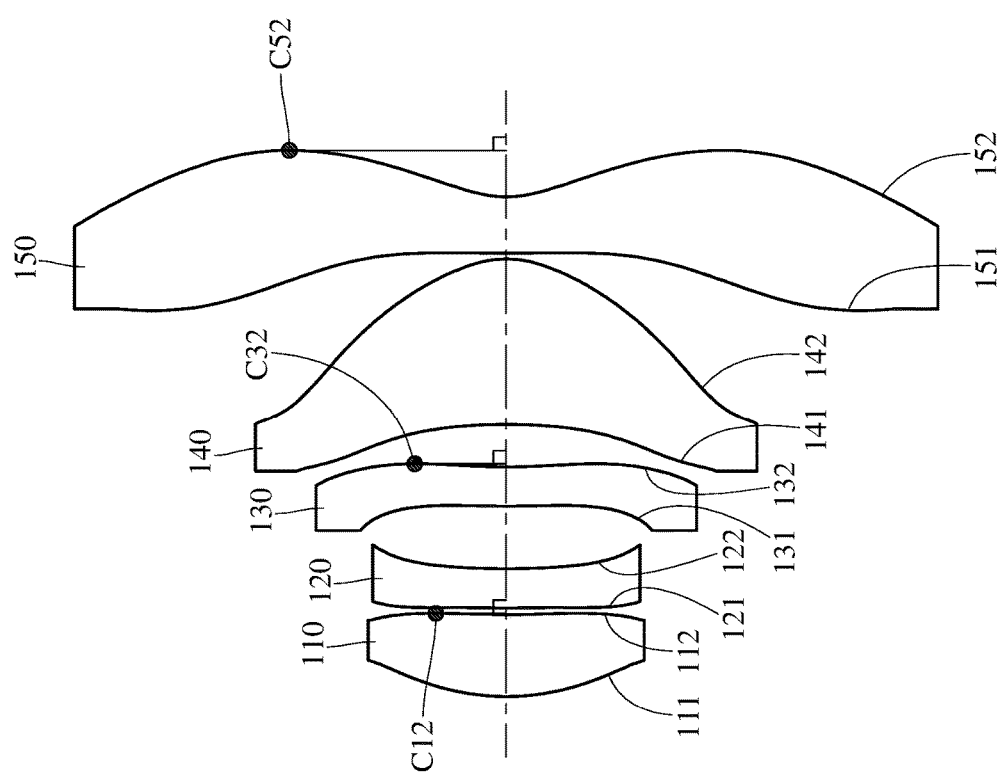
FIG. 25 is a schematic view of critical points according to the 1st embodiment of the present disclosure.

The first lens element with positive refractive power has an object-side surface being convex in a paraxial region thereof; therefore, it is favorable for reducing a total track length of the optical photographing lens assembly. Furthermore, the first lens element can have an image-side surface being concave in a paraxial region thereof, and the image-side surface of the first lens element can have at least one convex critical point in an off-axial region thereof; therefore, it is favorable for correcting off-axial aberrations and providing the first lens element with stronger positive refractive power. FIG. 25 shows a schematic view of critical points on the first, the third and the fifth lens elements according to the 1st embodiment of the present disclosure, wherein the image-side surface of the first lens element has at least one convex critical point C12 in an off-axial region thereof.

Figure 26:
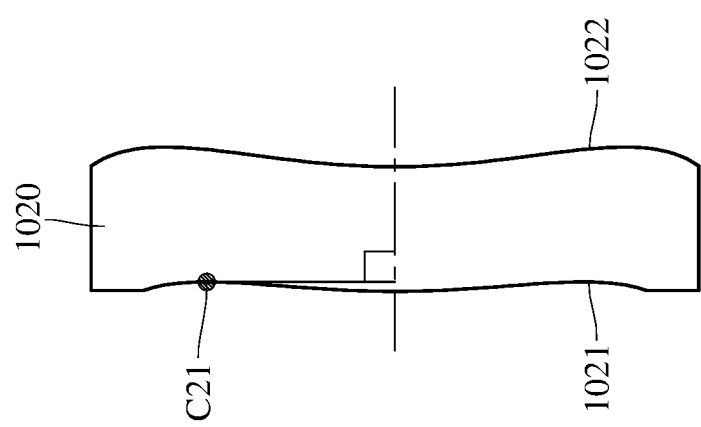
FIG. 26 is a schematic view of critical point on the second lens element according to the 10th embodiment of the present disclosure.

The second lens element with negative refractive power has an object-side surface being convex in a paraxial region thereof and an image-side surface being concave in a paraxial region thereof; therefore, it is favorable for correcting aberrations generated by the first lens element. Furthermore, the object-side surface of the second lens element can have at least one concave critical point in an off-axial region thereof; therefore, it is favorable for correcting off-axial aberrations so as to improve image quality. FIG. 26 shows a schematic view of critical point on the second lens element according to the 10th embodiment of the present disclosure, wherein the object-side surface of the second lens element has at least one concave critical point C21 in an off-axial region thereof.

The third lens element can have negative refractive power; therefore, it is favorable for distributing negative refractive power between the second lens element and the third lens element so as to reduce sensitivity of the optical photographing lens assembly. Furthermore, the third lens element can have an image-side surface being concave in a paraxial region thereof, and the image-side surface of the third lens element can have at least one convex critical point in an off-axial region thereof; therefore, it is favorable for correcting Petzval sum so as to improve the flatness of an image surface. As shown in FIG. 25, the image-side surface of the third lens element has at least one convex critical point C32 in an off-axial region thereof.

The fourth lens element with positive refractive power can have an object-side surface being concave in a paraxial region thereof, and the fourth lens element has an image-side surface being convex in a paraxial region thereof; therefore, it is favorable for light with a large angle of incidence projected into the optical photographing lens assembly so as to obtain a wide angle effect; furthermore, it is favorable with the first lens element having positive refractive power to further reduce the total track length.

The fifth lens element has negative refractive power; therefore, it is favorable for balancing the positive refractive power of the fourth lens element and correcting aberrations. Furthermore, the fifth lens element has an image-side surface being concave in a paraxial region thereof, and the image-side surface of the fifth lens element has at least one convex critical point in an off-axial region thereof; therefore, it is favorable for adjusting the light path at peripheral region so as to prevent excessive field curvature and to increase illuminance by reducing the incident angle of light projecting onto the image sensor. As shown in FIG. 25, the image-side surface of the fifth lens element has at least one convex critical point C52 in an off-axial region thereof.

When a central thickness of the fourth lens element is CT4, and a sum of axial distances between each of the five adjacent lens elements of the optical photographing lens assembly is ΣAT, the following condition is satisfied: 1.40<CT4/ΣAT. Therefore, it is favorable for tightly arranging the lens elements within a small space as well as preventing molding problems due to overly curved shape of the fourth lens element.

When a focal length of the optical photographing lens assembly is f, a focal length of the second lens element is f2, and a focal length of the third lens element is f3, the following condition is satisfied: |f/f2|+|f/f3|<0.80. Therefore, it is favorable for reducing differences among the refractive power of the lens elements close to the object side so that overly strong refractive power on a single lens element is prevented; thus, it is not necessary to allocate a highly curved lens element for correcting aberrations, so that it is favorable for light with large angle of incidence projected into the optical photographing lens assembly, thereby obtaining a wide angle effect and eliminating the stray light to improve image quality. Preferably, the following condition can also be satisfied: |f/f2|+|f/f3|<0.55.

When the central thickness of the fourth lens element is CT4, and a central thickness of the fifth lens element is CT5, the following condition can be satisfied: CT4/CT5<2.0. Therefore, it is favorable for the fifth lens element, which has the largest size among the first through fifth lens elements, having proper central thickness so as to increase manufacturing yield rate.

When the focal length of the optical photographing lens assembly is f, and a curvature radius of the object-side surface of the fifth lens element is R9, the following condition can be satisfied: f/R9<1.50. Therefore, it is favorable for preventing overly curved surfaces of the fifth lens element so as to reduce the influence of manufacturing tolerance on image quality; furthermore, it is favorable for the arrangement of surface shapes between the fourth lens element and the fifth lens element, thereby correcting field curvature. Preferably, the following condition can also be satisfied: −1.0<f/R9<0.50.

When an axial distance between the second lens element and the third lens element is T23, and an axial distance between the third lens element and the fourth lens element is T34, the following condition can be satisfied: 1.0<T23/T34<4.0. Therefore, it is favorable for preventing the axial distances between each of the second through fourth lens elements from overly short, so that the shapes of the lens elements are more flexible to design, thereby improving the imaging capability of each lens element. Preferably, the following condition can also be satisfied: 1.0<T23/T34<3.5.

When the focal length of the second lens element is f2, and the focal length of the third lens element is f3, the following condition can be satisfied: −0.40<f2/f3<2.5. Therefore, it is favorable for reducing the difference of the refractive power between the second lens element and the third lens element so as to maintain appropriate correction of aberrations, thereby improving image quality. Preferably, the following condition can also be satisfied: 0.40<f2/f3<2.0.

When an Abbe number of the second lens element is V2, and an Abbe number of the third lens element is V3, the following condition can be satisfied: V2+V3<60. Therefore, it is favorable for balancing between corrections of astigmatism and chromatic aberration.

When an axial distance between the object-side surface of the first lens element and the image surface is TL, and a maximum image height of the optical photographing lens assembly (half of a diagonal length of an effective photosensitive area of an image sensor) is ImgH, the following condition can be satisfied: TL/ImgH<2.50. Therefore, it is favorable for the optical photographing lens assembly to meet the requirements of compactness and large field of view.

When a central thickness of the second lens element is CT2, a central thickness of the third lens element is CT3, and the central thickness of the fourth lens element is CT4, the following condition can be satisfied: 1.75<CT4/(CT2+CT3)<3.50. Therefore, it is favorable for adjusting light path with a sufficient central thickness of the fourth lens element; furthermore, molding problems due to overly small thicknesses of the second lens element and the third lens element are prevented.

According to the present disclosure, the lens elements of the optical photographing lens assembly can be made of glass or plastic material. When the lens elements are made of glass material, the refractive power distribution of the optical photographing lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the optical photographing lens assembly can also be reduced.

According to the present disclosure, each of an object-side surface and an image-side surface of a lens element has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, a convex critical point or a concave critical point on a surface of a lens element is a non-axial point on the surface thereof where its tangent is perpendicular to the optical axis. Specifically, the critical points mentioned above are not located on the optical axis.

According to the present disclosure, an image surface of the optical photographing lens assembly on a corresponding image sensor can be flat or curved, particularly a concave curved surface facing towards the object side of the optical photographing lens assembly.

According to the present disclosure, the optical photographing lens assembly can include at least one stop, such as an aperture stop, a glare stop or a field stop. Said glare stop or said field stop is allocated for eliminating the stray light and thereby improving image quality thereof.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the above description of the present disclosure, the following specific embodiments are provided for further explanation.

1st Embodiment

Figure 1:
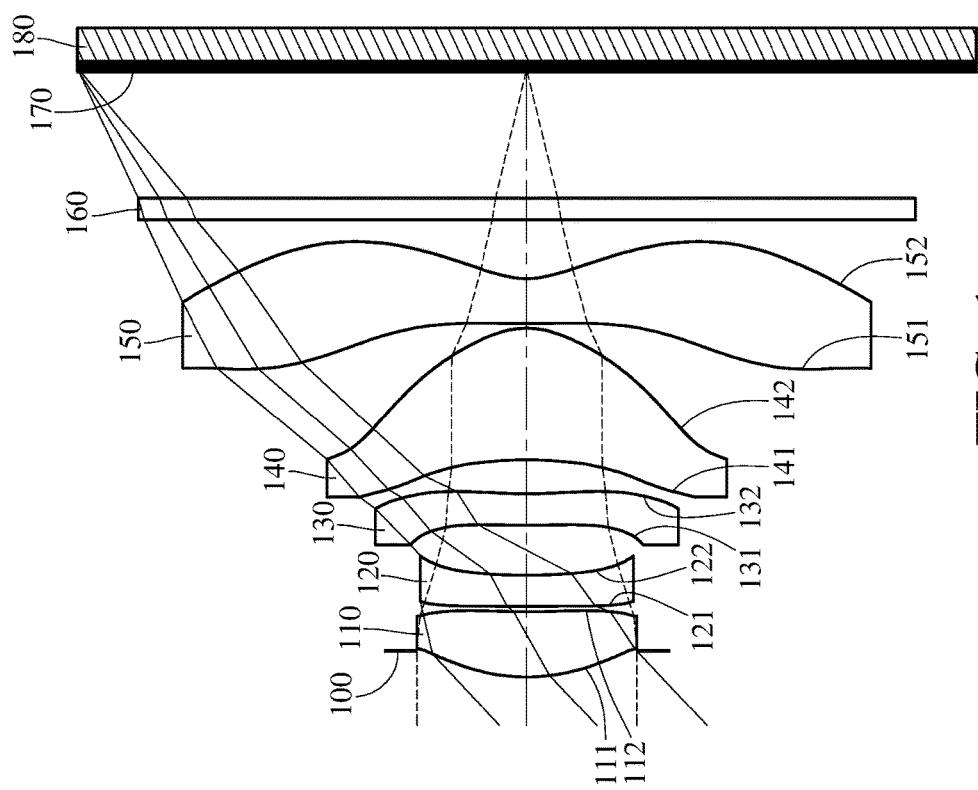
FIG. 1 is a schematic view of an image capturing unit according to the 1st embodiment of the present disclosure.
Figure 2:
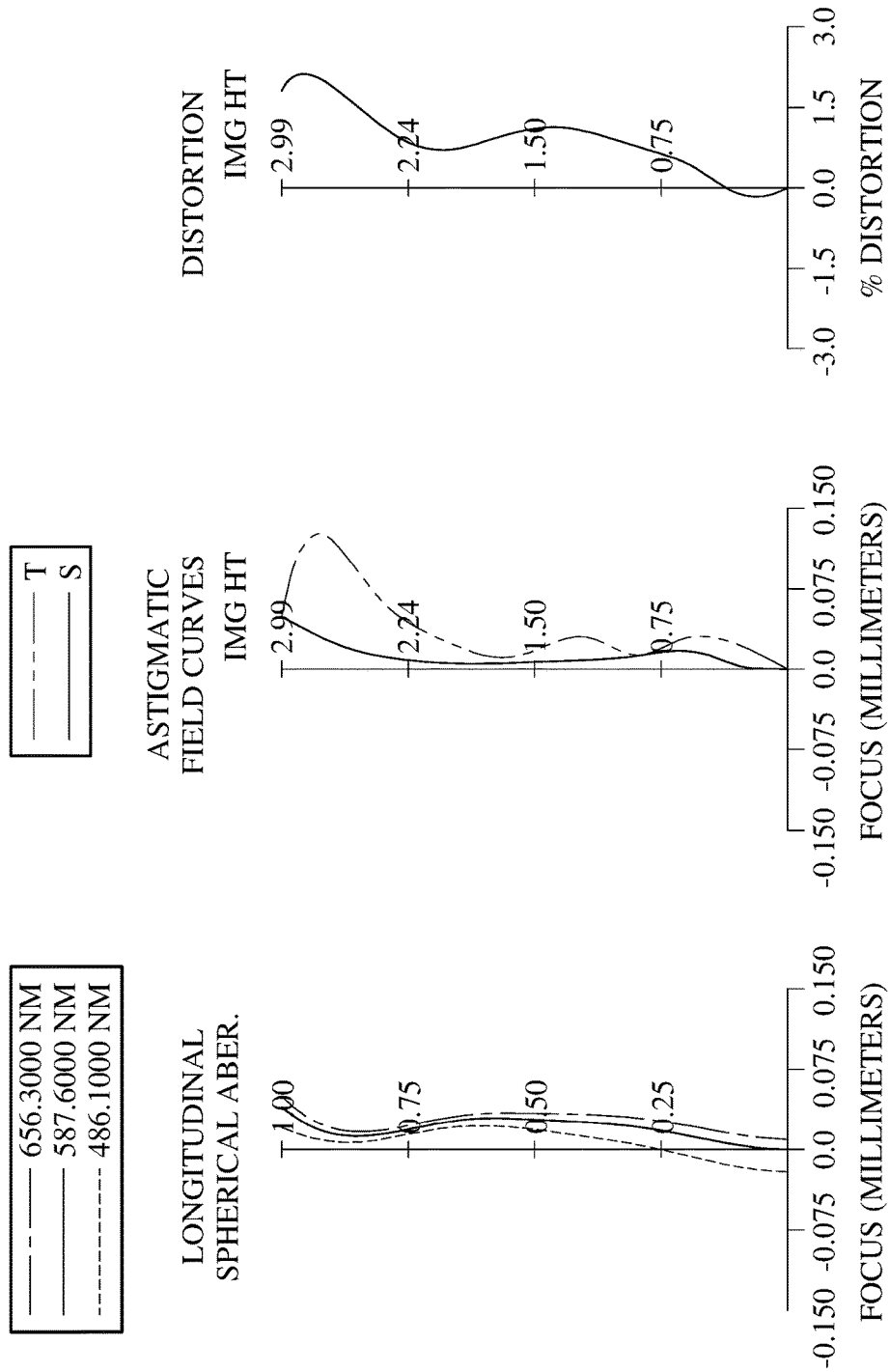
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical photographing lens assembly (its reference numeral is omitted) of the present disclosure and an image sensor 180. The optical photographing lens assembly includes, in order from an object side to an image side, an aperture stop 100, a first lens element 110, a second lens element 120, a third lens element 130, a fourth lens element 140, a fifth lens element 150, an IR-cut filter 160 and an image surface 170. The optical photographing lens assembly includes five lens elements (110, 120, 130, 140, and 150) with no additional lens element disposed between the first lens element 110 and the fifth lens element 150.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The image-side surface 112 of the first lens element 110 has at least one convex critical point in an off-axial region thereof.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has at least one concave critical point in an off-axial region thereof.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The image-side surface 132 of the third lens element 130 has at least one convex critical point in an off-axial region thereof.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one convex critical point in an off-axial region thereof.

The IR-cut filter 160 is made of glass material and located between the fifth lens element 150 and the image surface 170, and will not affect the focal length of the optical photographing lens assembly. The image sensor 180 is disposed on or near the image surface 170 of the optical photographing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical photographing lens assembly of the image capturing unit according to the 1st embodiment, when a focal length of the optical photographing lens assembly is f, an f-number of the optical photographing lens assembly is Fno, and half of a maximum field of view of the optical photographing lens assembly is HFOV, these parameters have the following values: f=3.12 millimeters (mm); Fno=2.12; and HFOV=43.2 degrees (deg.).

When an Abbe number of the second lens element 120 is V2, and an Abbe number of the third lens element 130 is V3, the following condition is satisfied: V2+V3=46.4.

When an axial distance between the second lens element 120 and the third lens element 130 is T23, and an axial distance between the third lens element 130 and the fourth lens element 140 is T34, the following condition is satisfied: T23/T34=1.47.

When a central thickness of the second lens element 120 is CT2, a central thickness of the third lens element 130 is CT3, and a central thickness of the fourth lens element 140 is CT4, the following condition is satisfied: CT4/(CT2+CT3)=2.11.

When the central thickness of the fourth lens element 140 is CT4, and a central thickness of the fifth lens element 150 is CT5, the following condition is satisfied: CT4/CT5=2.95.

When the central thickness of the fourth lens element 140 is CT4, and a sum of axial distances between each of the five adjacent lens elements of the optical photographing lens assembly is ΣAT, the following condition is satisfied: CT4/ΣAT=1.42. In this embodiment, the axial distance between two adjacent lens elements is the air gap in a paraxial region between the two adjacent lens elements.

When the focal length of the optical photographing lens assembly is f, a focal length of the second lens element 120 is f2, and a focal length of the third lens element 130 is f3, the following condition is satisfied: |f/f2|+|f/f3|=0.50. When the focal length of the second lens element 120 is f2, and the focal length of the third lens element 130 is f3, the following condition is satisfied: f2/f3=1.24.

When the focal length of the optical photographing lens assembly is f, and a curvature radius of the object-side surface 151 of the fifth lens element 150 is R9, the following condition is satisfied: f/R9=0.28.

When an axial distance between the object-side surface 111 of the first lens element 110 and the image surface 170 is TL, and a maximum image height of the optical photographing lens assembly is ImgH, the following condition is satisfied: TL/ImgH=1.35.

The detailed optical data of the 1st embodiment are shown in Table 1 and the aspheric surface data are shown in Table 2 below.

TABLE 1

1st Embodiment
f = 3.12 mm, Fno = 2.12, HFOV = 43.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.174 | | | | |
| 2 | Lens 1 | 1.278 | (ASP) | 0.436 | Plastic | 1.545 | 56.0 | 3.14 |
| 3 | | 4.428 | (ASP) | 0.035 | | | | |
| 4 | Lens 2 | 8.614 | (ASP) | 0.210 | Plastic | 1.614 | 26.0 | −13.91 |
| 5 | | 4.249 | (ASP) | 0.333 | | | | |
| 6 | Lens 3 | 5.963 | (ASP) | 0.210 | Plastic | 1.660 | 20.4 | −11.22 |
| 7 | | 3.257 | (ASP) | 0.226 | | | | |
| 8 | Lens 4 | −3.156 | (ASP) | 0.885 | Plastic | 1.544 | 55.9 | 1.00 |
| 9 | | −0.510 | (ASP) | 0.030 | | | | |
| 10 | Lens 5 | 11.182 | (ASP) | 0.300 | Plastic | 1.534 | 55.9 | −1.04 |
| 11 | | 0.526 | (ASP) | 0.393 | | | | |
| 12 | IR-cut filter | Plano | | 0.145 | Glass | 1.517 | 64.2 | — |
| 13 | | Plano | | 0.847 | | | | |
| 14 | Image | Plano | | — | | | | |

Note:
Reference wavelength is 587.6 nm (d-line).
An effective radius of the image-side surface 122 (Surface 5) is 0.712 mm.

TABLE 2

Aspheric Coefficients

| Surface # | 2 | 3 | 4 | 5 | 6 |
|---|---|---|---|---|---|
| k = | −4.1696E+00 | 9.6813E+00 | 9.0000E+01 | 3.0627E+01 | −4.2381E+01 |
| A4 = | 1.9360E−01 | −5.3045E−01 | −4.6698E−01 | −1.0633E−01 | −4.5346E−01 |
| A6 = | 1.5523E−01 | 4.3082E−01 | 1.2737E+00 | 9.3187E−01 | −1.6601E−01 |
| A8 = | −2.0016E+00 | 1.8884E+00 | 6.7190E−01 | −5.4389E−01 | 3.0342E+00 |
| A10 = | 6.0478E+00 | −8.1201E+00 | −7.1892E+00 | −2.9346E+00 | −1.2073E+01 |
| A12 = | −9.9174E+00 | 1.0516E+01 | 1.1653E+01 | 7.4853E+00 | 2.0472E+01 |
| A14 = | 5.6697E+00 | −4.6121E+00 | −5.7164E+00 | −5.6828E+00 | −1.3595E+01 |

| Surface # | 7 | 8 | 9 | 10 | 11 |
|---|---|---|---|---|---|
| k = | −2.2054E+01 | −3.1417E+01 | −4.1832E+00 | −9.9000E+01 | −6.5158E+00 |
| A4 = | −3.3977E−01 | −2.9870E−01 | −4.0313E−01 | −2.1101E−01 | −1.6740E−01 |
| A6 = | 8.1286E−02 | 4.9234E−01 | 2.6818E−01 | 8.7462E−02 | 1.0539E−01 |
| A8 = | 8.0307E−01 | −1.7928E+00 | 2.3022E−01 | −2.1715E−03 | −5.1424E−02 |
| A10 = | −2.6251E+00 | 3.6154E+00 | −1.0337E+00 | −7.2003E−03 | 1.6135E−02 |
| A12 = | 3.9398E+00 | −3.3049E+00 | 1.1615E+00 | 2.1446E−03 | −3.0016E−03 |
| A14 = | −2.8473E+00 | 1.4109E+00 | −5.2811E−01 | −2.6151E−04 | 3.0272E−04 |
| A16 = | 7.8311E−01 | −2.3405E−01 | 8.5364E−02 | 1.2022E−05 | −1.2793E−05 |

In Table 1, the curvature radius, the thickness and the focal length are shown in millimeters (mm). Surface numbers 0-14 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the terms in the tables are the same as Table 1 and Table 2 of the 1st embodiment. Therefore, an explanation in this regard will not be provided again.

2nd Embodiment

Figure 3:
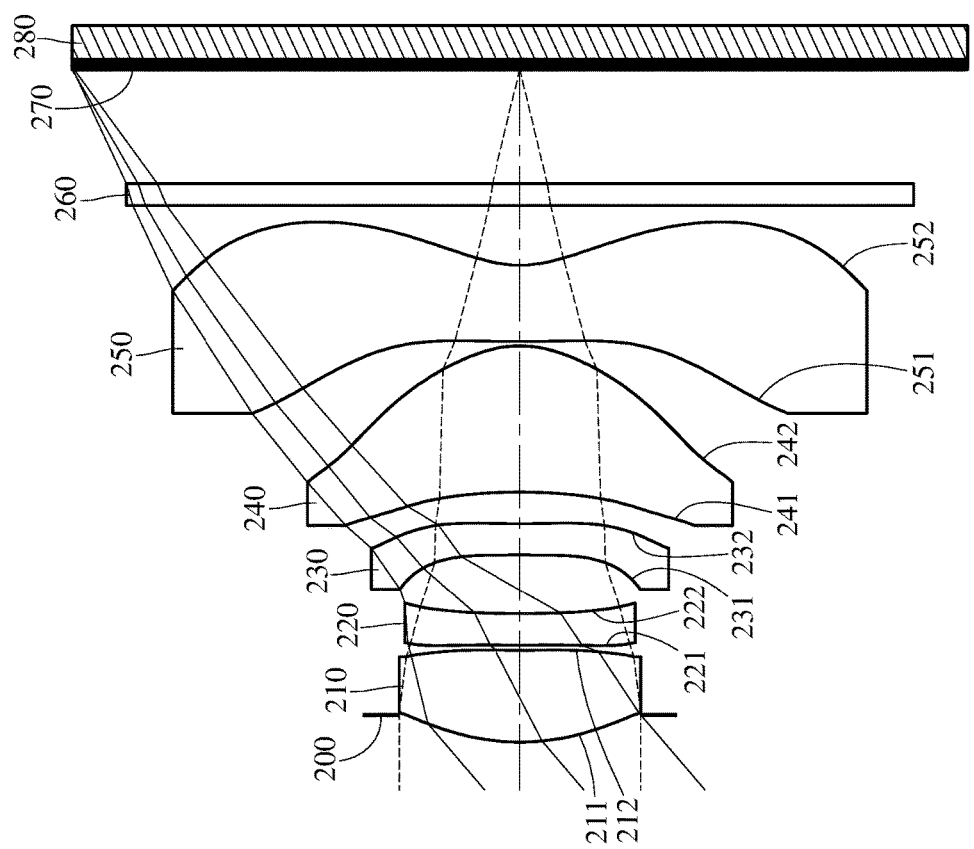
FIG. 3 is a schematic view of an image capturing unit according to the 2nd embodiment of the present disclosure.
Figure 4:
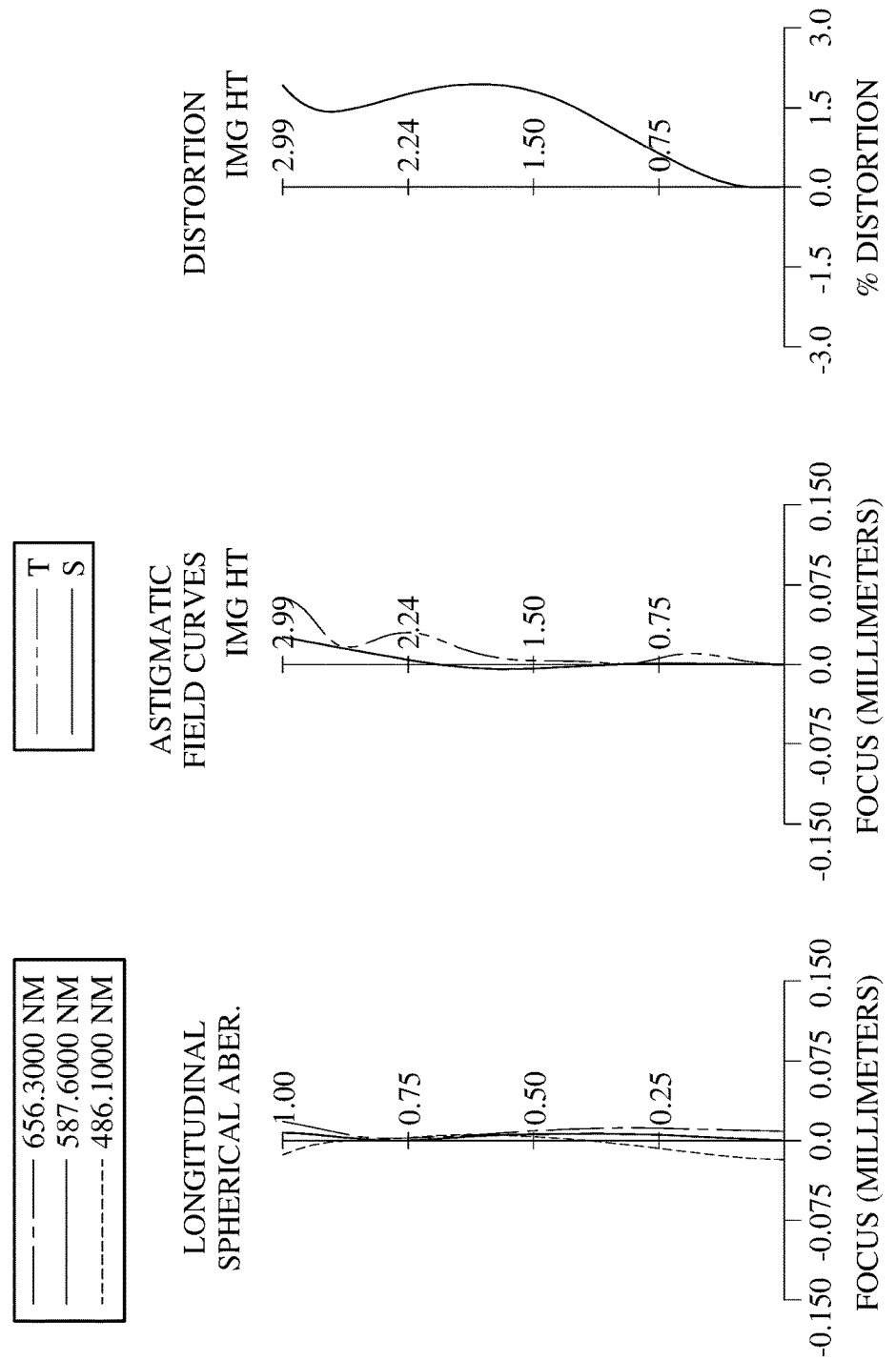
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical photographing lens assembly (its reference numeral is omitted) of the present disclosure and an image sensor 280. The optical photographing lens assembly includes, in order from an object side to an image side, an aperture stop 200, a first lens element 210, a second lens element 220, a third lens element 230, a fourth lens element 240, a fifth lens element 250, an IR-cut filter 260 and an image surface 270. The optical photographing lens assembly includes five lens elements (210, 220, 230, 240, and 250) with no additional lens element disposed between the first lens element 210 and the fifth lens element 250.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The image-side surface 212 of the first lens element 210 has at least one convex critical point in an off-axial region thereof.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has at least one concave critical point in an off-axial region thereof.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric. The image-side surface 232 of the third lens element 230 has at least one convex critical point in an off-axial region thereof.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one convex critical point in an off-axial region thereof.

The IR-cut filter 260 is made of glass material and located between the fifth lens element 250 and the image surface 270, and will not affect the focal length of the optical photographing lens assembly. The image sensor 280 is disposed on or near the image surface 270 of the optical photographing lens assembly.

The detailed optical data of the 2nd embodiment are shown in Table 3 and the aspheric surface data are shown in Table 4 below.

TABLE 3

2nd Embodiment
f = 3.42 mm, Fno = 2.12, HFOV = 40.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.180 | | | | |
| 2 | Lens 1 | 1.545 | (ASP) | 0.613 | Plastic | 1.544 | 55.9 | 3.27 |
| 3 | | 10.100 | (ASP) | 0.035 | | | | |
| 4 | Lens 2 | 12.886 | (ASP) | 0.210 | Plastic | 1.633 | 23.4 | −16.63 |
| 5 | | 5.756 | (ASP) | 0.396 | | | | |
| 6 | Lens 3 | −100.000 | (ASP) | 0.210 | Plastic | 1.671 | 19.3 | −11.27 |
| 7 | | 8.186 | (ASP) | 0.211 | | | | |
| 8 | Lens 4 | −3.307 | (ASP) | 0.976 | Plastic | 1.544 | 55.9 | 1.48 |
| 9 | | −0.716 | (ASP) | 0.030 | | | | |
| 10 | Lens 5 | 10.669 | (ASP) | 0.513 | Plastic | 1.534 | 55.9 | −1.52 |
| 11 | | 0.742 | (ASP) | 0.400 | | | | |
| 12 | IR-cut filter | Plano | | 0.145 | Glass | 1.517 | 64.2 | — |
| 13 | | Plano | | 0.760 | | | | |
| 14 | Image | Plano | | — | | | | |

Note:
Reference wavelength is 587.6 nm (d-line).
An effective radius of the image-side surface 222 (Surface 5) is 0.770 mm.

TABLE 4

Aspheric Coefficients

| Surface # | 2 | 3 | 4 | 5 | 6 |
|---|---|---|---|---|---|
| k = | −4.5417E+00 | 9.6813E+00 | 9.0000E+01 | −1.0101E+01 | −4.2638E+01 |
| A4 = | 1.2741E−01 | −5.1557E−01 | −4.8658E−01 | −1.1097E−01 | −4.4070E−01 |
| A6 = | −3.1465E−02 | 9.2083E−01 | 1.3358E+00 | 6.1732E−01 | −1.4493E−01 |
| A8 = | −3.5328E−01 | −3.6607E−01 | −7.2842E−01 | −8.4886E−01 | 8.3308E−02 |
| A10 = | 9.1700E−01 | −1.7412E+00 | −1.8382E+00 | 7.4996E−01 | 8.9041E−01 |
| A12 = | −1.2900E+00 | 2.8151E+00 | 3.5623E+00 | −7.9608E−01 | −2.6969E+00 |
| A14 = | 6.4211E−01 | −1.2861E+00 | −1.6719E+00 | 6.9775E−01 | 1.6419E+00 |

| Surface # | 7 | 8 | 9 | 10 | 11 |
|---|---|---|---|---|---|
| k = | −2.2054E+01 | −3.1417E+01 | −3.5461E+00 | −9.9000E+01 | −5.6030E+00 |
| A4 = | −2.7756E−01 | −4.9583E−02 | −1.1486E−01 | −8.0452E−02 | −1.0847E−01 |
| A6 = | −2.5080E−01 | 6.9838E−02 | −1.2111E−01 | −2.0337E−01 | 4.3416E−02 |

TABLE 4-continued

| Aspheric Coefficients | | | | | |
|---|---|---|---|---|---|
| A8 = | 4.1718E−01 | −1.2144E+00 | 2.5426E−01 | 2.7800E−01 | −1.2268E−02 |
| A10 = | 3.9865E−01 | 3.0429E+00 | −2.9814E−01 | −1.6450E−01 | 1.9402E−03 |
| A12 = | −1.2768E+00 | −3.2073E+00 | 2.1033E−01 | 5.2808E−02 | −1.3508E−04 |
| A14 = | 9.9122E−01 | 1.6110E+00 | −6.8406E−02 | −8.8386E−03 | −4.3673E−06 |
| A16 = | −2.2535E−01 | −3.2057E−01 | 7.5645E−03 | 6.0200E−04 | 9.3545E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.42 | CT4/CT5 | 1.90 |
| Fno | 2.12 | CT4/ΣAT | 1.45 |
| HFOV [deg.] | 40.6 | \|f/f2\| + \|f/f3\| | 0.51 |
| V2 + V3 | 42.7 | f2/f3 | 1.48 |
| T23/T34 | 1.88 | f/R9 | 0.32 |
| CT4/(CT2 + CT3) | 2.32 | TL/ImgH | 1.50 |

3rd Embodiment

Figure 5:
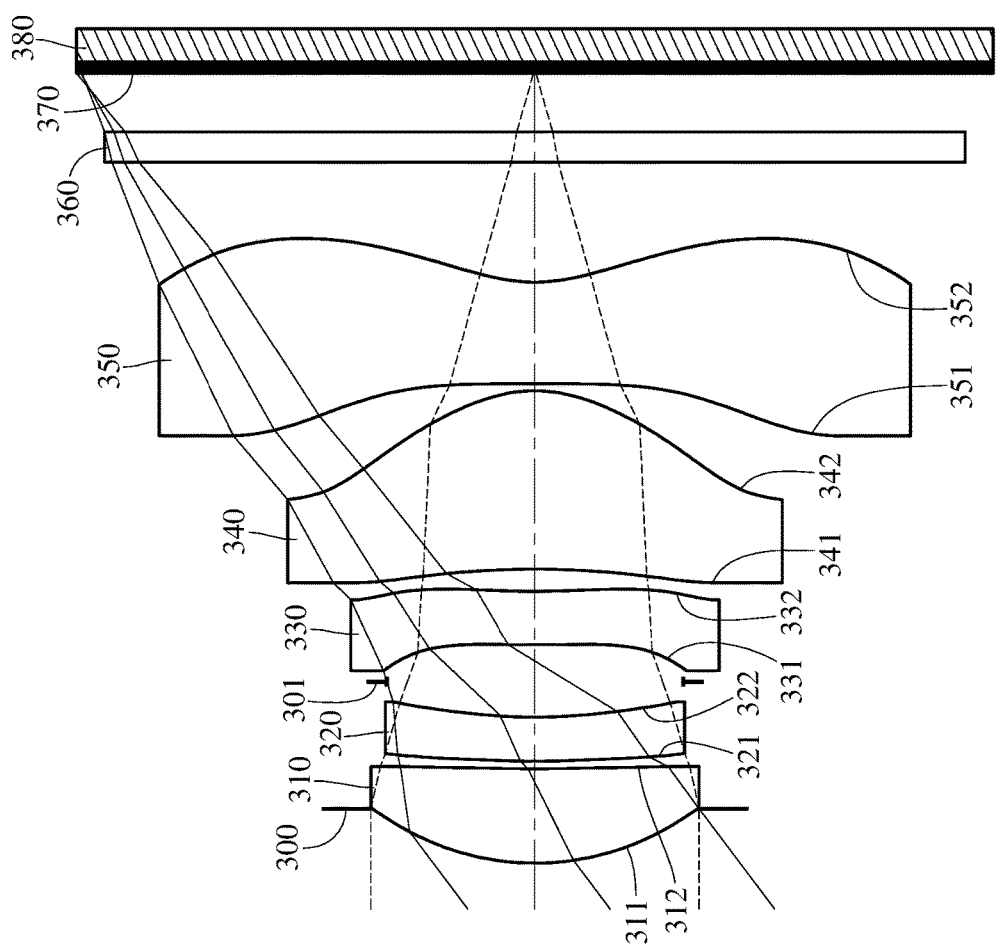
FIG. 5 is a schematic view of an image capturing unit according to the 3rd embodiment of the present disclosure.
Figure 6:
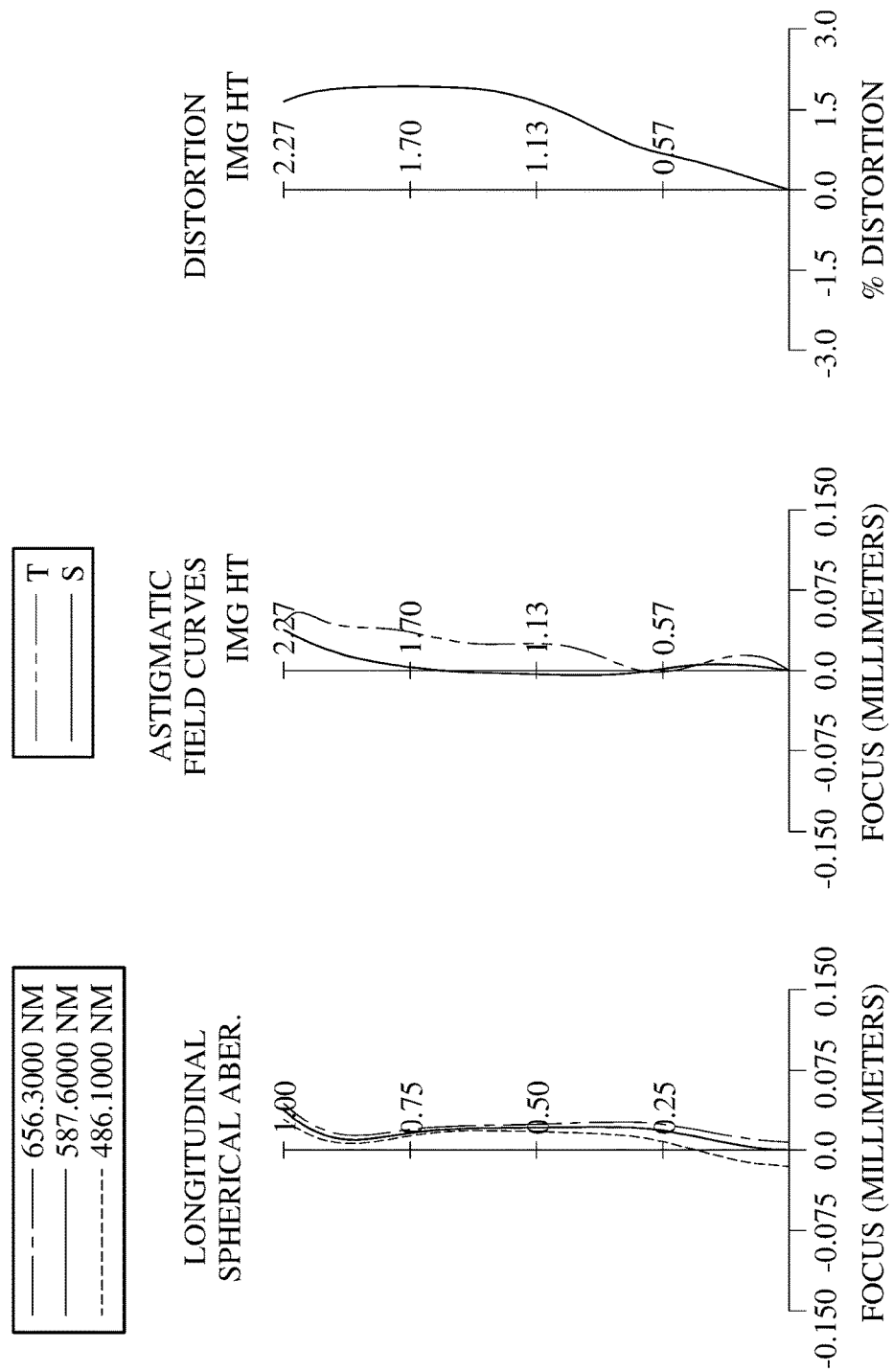
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical photographing lens assembly (its reference numeral is omitted) of the present disclosure and an image sensor 380. The optical photographing lens assembly includes, in order from an object side to an image side, an aperture stop 300, a first lens element 310, a second lens element 320, a stop 301, a third lens element 330, a fourth lens element 340, a fifth lens element 350, an IR-cut filter 360 and an image surface 370. The optical photographing lens assembly includes five lens elements (310, 320, 330, 340, and 350) with no additional lens element disposed between the first lens element 310 and the fifth lens element 350.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The image-side surface 312 of the first lens element 310 has at least one convex critical point in an off-axial region thereof.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The image-side surface 332 of the third lens element 330 has at least one convex critical point in an off-axial region thereof.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one convex critical point in an off-axial region thereof.

The IR-cut filter 360 is made of glass material and located between the fifth lens element 350 and the image surface 370, and will not affect the focal length of the optical photographing lens assembly. The image sensor 380 is disposed on or near the image surface 370 of the optical photographing lens assembly.

The detailed optical data of the 3rd embodiment are shown in Table 5 and the aspheric surface data are shown in Table 6 below.

TABLE 5

3rd Embodiment
f = 2.95 mm, Fno = 1.80, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.271 | | | | |
| 2 | Lens 1 | 1.327 | (ASP) | 0.471 | Plastic | 1.545 | 56.1 | 3.00 |
| 3 | | 6.148 | (ASP) | 0.038 | | | | |
| 4 | Lens 2 | 3.789 | (ASP) | 0.220 | Plastic | 1.661 | 20.3 | −12.46 |
| 5 | | 2.534 | (ASP) | 0.177 | | | | |

TABLE 5-continued

3rd Embodiment
f = 2.95 mm, Fno = 1.80, HFOV = 37.0 deg.

| Surface # | | Curvature Radius | | Thickness | Material | Index | Abbe # | Focal Length |
|---|---|---|---|---|---|---|---|---|
| 6 | Stop | Plano | | 0.184 | | | | |
| 7 | Lens 3 | 9.292 | (ASP) | 0.270 | Plastic | 1.661 | 20.3 | −13.06 |
| 8 | | 4.421 | (ASP) | 0.111 | | | | |
| 9 | Lens 4 | −4.002 | (ASP) | 0.890 | Plastic | 1.544 | 56.0 | 1.41 |
| 10 | | −0.693 | (ASP) | 0.035 | | | | |
| 11 | Lens 5 | −196.834 | (ASP) | 0.510 | Plastic | 1.544 | 56.0 | −1.46 |
| 12 | | 0.799 | (ASP) | 0.600 | | | | |
| 13 | IR-cut filter | Plano | | 0.150 | Glass | 1.517 | 64.2 | — |
| 14 | | Plano | | 0.293 | | | | |
| 15 | Image | Plano | | — | | | | |

Note:
Reference wavelength is 587.6 nm (d-line).
An effective radius of the stop 301 (Surface 6) is 0.740 mm.

TABLE 6

Aspheric Coefficients

| Surface # | 2 | 3 | 4 | 5 | 7 |
|---|---|---|---|---|---|
| k = | −4.0925E+00 | −5.5006E+01 | −9.0000E+01 | −6.0907E+00 | 1.9479E+01 |
| A4 = | 1.8818E−01 | −4.7514E−01 | −4.1856E−01 | −2.3043E−01 | −3.9434E−01 |
| A6 = | 1.4868E−01 | 2.0168E+00 | 1.8144E+00 | 6.7545E−01 | −8.3301E−01 |
| A8 = | −1.0247E+00 | −4.8765E+00 | −3.7343E+00 | −7.2019E−01 | 4.5125E+00 |
| A10 = | 2.3997E+00 | 7.9526E+00 | 5.0303E+00 | −5.4141E−01 | −1.3648E+01 |
| A12 = | −2.5659E+00 | −8.4976E+00 | −4.9084E+00 | 1.6030E+00 | 1.9134E+01 |
| A14 = | 9.3838E−01 | 4.1064E+00 | 2.6712E+00 | −6.6898E−01 | −9.6876E+00 |

| Surface # | 8 | 9 | 10 | 11 | 12 |
|---|---|---|---|---|---|
| k = | −3.5363E+01 | −5.8180E+01 | −4.5474E+00 | 8.9999E+01 | −6.6282E+00 |
| A4 = | −1.7298E−01 | 1.3071E−02 | −4.9155E−01 | −1.8683E−01 | −1.5137E−01 |
| A6 = | −5.8564E−01 | −4.3541E−01 | 1.0965E+00 | 1.8838E−02 | 9.8783E−02 |
| A8 = | 2.0419E+00 | 1.2213E+00 | −1.9598E+00 | 6.6165E−02 | −5.6492E−02 |
| A10 = | −3.6174E+00 | −1.4254E+00 | 2.2619E+00 | −3.2067E−02 | 2.1903E−02 |
| A12 = | 3.4346E+00 | 8.9031E−01 | −1.3832E+00 | 5.6765E−03 | −5.2975E−03 |
| A14 = | −1.2139E+00 | −2.5336E−01 | 4.1652E−01 | −3.6025E−04 | 7.0463E−04 |
| A16 = | — | — | −4.9482E−02 | −1.2978E−06 | −3.8602E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.95 | CT4/CT5 | 1.75 |
| Fno | 1.80 | CT4/ΣAT | 1.63 |
| HFOV [deg.] | 37.0 | \|f/f2\| + \|f/f3\| | 0.46 |
| V2 + V3 | 40.6 | f2/f3 | 0.95 |
| T23/T34 | 3.25 | f/R9 | −0.01 |
| CT4/(CT2 + CT3) | 1.82 | TL/ImgH | 1.74 |

4th Embodiment

Figure 7:
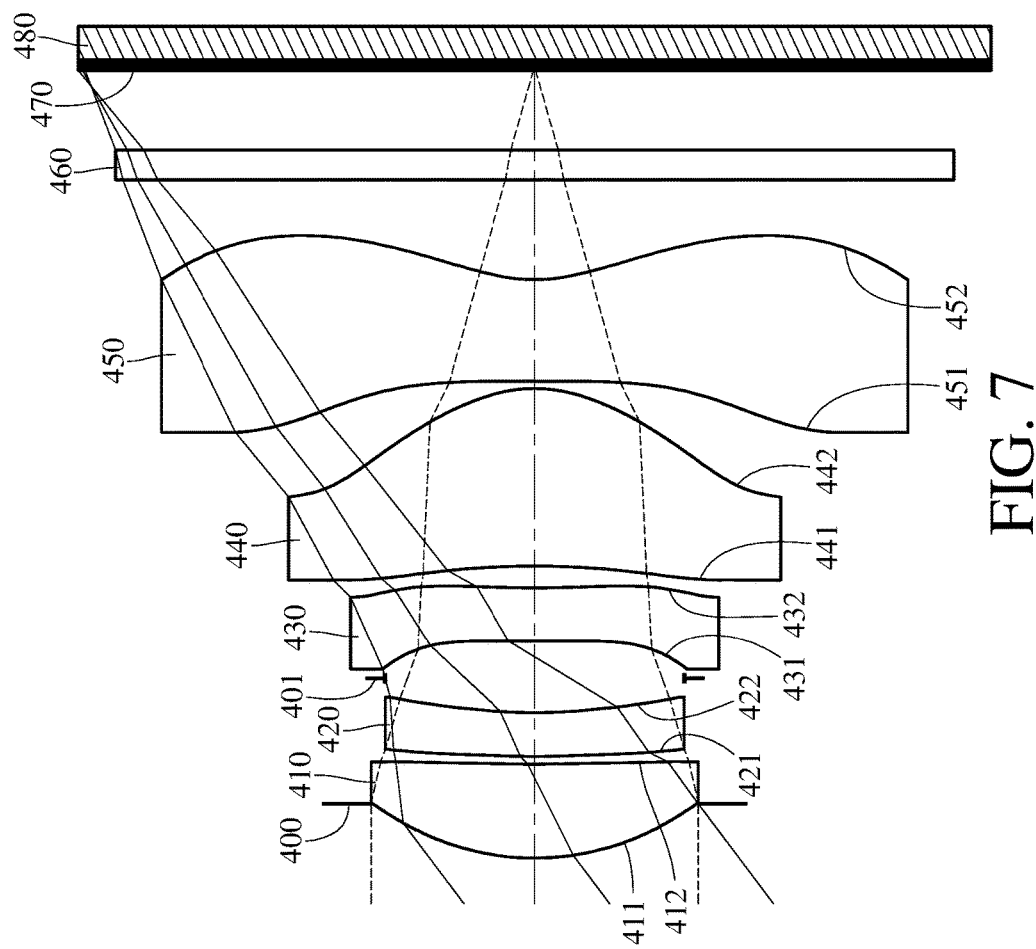
FIG. 7 is a schematic view of an image capturing unit according to the 4th embodiment of the present disclosure.
Figure 8:
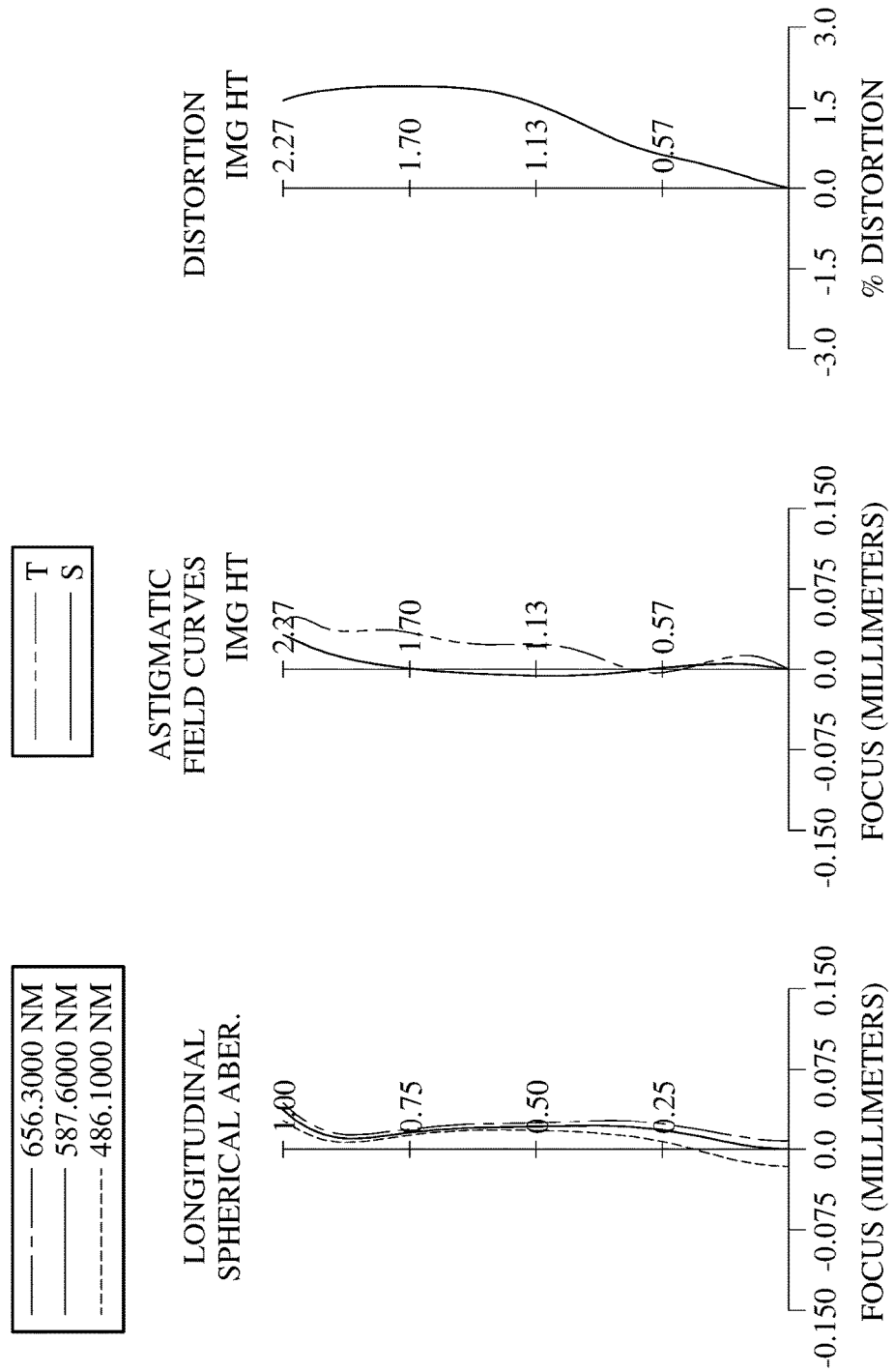
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical photographing lens assembly (its reference numeral is omitted) of the present disclosure and an image sensor 480. The optical photographing lens assembly includes, in order from an object side to an image side, an aperture stop 400, a first lens element 410, a second lens element 420, a stop 401, a third lens element 430, a fourth lens element 440, a fifth lens element 450, an IR-cut filter 460 and an image surface 470. The optical photographing lens assembly includes five lens elements (410, 420, 430, 440, and 450) with no additional lens element disposed between the first lens element 410 and the fifth lens element 450.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The image-side surface 412 of the first lens element 410 has at least one convex critical point in an off-axial region thereof.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The image-side surface 432 of the third lens element 430 has at least one convex critical point in an off-axial region thereof.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one convex critical point in an off-axial region thereof.

The IR-cut filter 460 is made of glass material and located between the fifth lens element 450 and the image surface 470, and will not affect the focal length of the optical photographing lens assembly. The image sensor 480 is disposed on or near the image surface 470 of the optical photographing lens assembly.

The detailed optical data of the 4th embodiment are shown in Table 7 and the aspheric surface data are shown in Table 8 below.

TABLE 7

4th Embodiment
f = 2.95 mm, Fno = 1.80, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.271 | | | | |
| 2 | Lens 1 | 1.324 | (ASP) | 0.471 | Plastic | 1.545 | 56.1 | 3.00 |
| 3 | | 6.099 | (ASP) | 0.038 | | | | |
| 4 | Lens 2 | 3.899 | (ASP) | 0.220 | Plastic | 1.661 | 20.3 | −12.77 |
| 5 | | 2.607 | (ASP) | 0.172 | | | | |
| 6 | Stop | Plano | | 0.187 | | | | |
| 7 | Lens 3 | 10.848 | (ASP) | 0.269 | Plastic | 1.661 | 20.3 | −13.44 |
| 8 | | 4.833 | (ASP) | 0.110 | | | | |
| 9 | Lens 4 | −3.733 | (ASP) | 0.890 | Plastic | 1.544 | 56.0 | 1.41 |
| 10 | | −0.691 | (ASP) | 0.036 | | | | |
| 11 | Lens 5 | −200.000 | (ASP) | 0.513 | Plastic | 1.544 | 56.0 | −1.46 |
| 12 | | 0.800 | (ASP) | 0.500 | | | | |
| 13 | IR-cut filter | Plano | | 0.150 | Glass | 1.517 | 64.2 | — |
| 14 | | Plano | | 0.398 | | | | |
| 15 | Image | Plano | | — | | | | |

Note:
Reference wavelength is 587.6 nm (d-line).
An effective radius of the stop 401 (Surface 6) is 0.750 mm.

TABLE 8

Aspheric Coefficients

| Surface # | 2 | 3 | 4 | 5 | 7 |
|---|---|---|---|---|---|
| k = | −4.0662E+00 | −6.2771E+01 | −9.0000E+01 | −5.8708E+00 | −6.1103E+00 |
| A4 = | 1.8993E−01 | −4.4225E−01 | −4.0415E−01 | −2.2075E−01 | −3.8377E−01 |
| A6 = | 1.3195E−01 | 1.7440E+00 | 1.6196E+00 | 5.9354E−01 | −9.0243E−01 |
| A8 = | −9.3714E−01 | −3.7793E+00 | −2.8494E+00 | −4.1414E−01 | 4.8341E+00 |
| A10 = | 2.1810E+00 | 5.5585E+00 | 2.9906E+00 | −1.1132E+00 | −1.4518E+01 |
| A12 = | −2.3087E+00 | −5.8281E+00 | −2.5467E+00 | 2.0355E+00 | 2.0208E+01 |
| A14 = | 8.2003E−01 | 2.9299E+00 | 1.6149E+00 | −6.9866E−01 | −1.0151E+01 |

| Surface # | 8 | 9 | 10 | 11 | 12 |
|---|---|---|---|---|---|
| k = | −3.0070E+01 | −6.4490E+01 | −4.3817E+00 | −9.0000E+01 | −6.6464E+00 |
| A4 = | −1.7486E−01 | −1.4856E−02 | −4.4300E−01 | −1.6249E−01 | −1.4470E−01 |
| A6 = | −5.8976E−01 | −2.8799E−01 | 9.3489E−01 | −1.4785E−02 | 9.1027E−02 |
| A8 = | 2.0990E+00 | 8.9285E−01 | −1.6171E+00 | 8.5219E−02 | −5.1609E−02 |
| A10 = | −3.7898E+00 | −1.0629E+00 | 1.8070E+00 | −3.7124E−02 | 2.0098E−02 |
| A12 = | 3.6282E+00 | 6.9612E−01 | −1.0383E+00 | 6.1439E−03 | −4.9186E−03 |
| A14 = | −1.2867E+00 | −2.1341E−01 | 2.8153E−01 | −3.2412E−04 | 6.6483E−04 |
| A16 = | — | — | −2.8402E−02 | −8.1583E−06 | −3.7141E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.95 | CT4/CT5 | 1.73 |
| Fno | 1.80 | CT4/ΣAT | 1.64 |
| HFOV [deg.] | 37.0 | \|f/f2\| + \|f/f3\| | 0.45 |
| V2 + V3 | 40.6 | f2/f3 | 0.95 |
| T23/T34 | 3.26 | f/R9 | −0.01 |
| CT4/(CT2 + CT3) | 1.82 | TL/ImgH | 1.74 |

5th Embodiment

Figure 9:
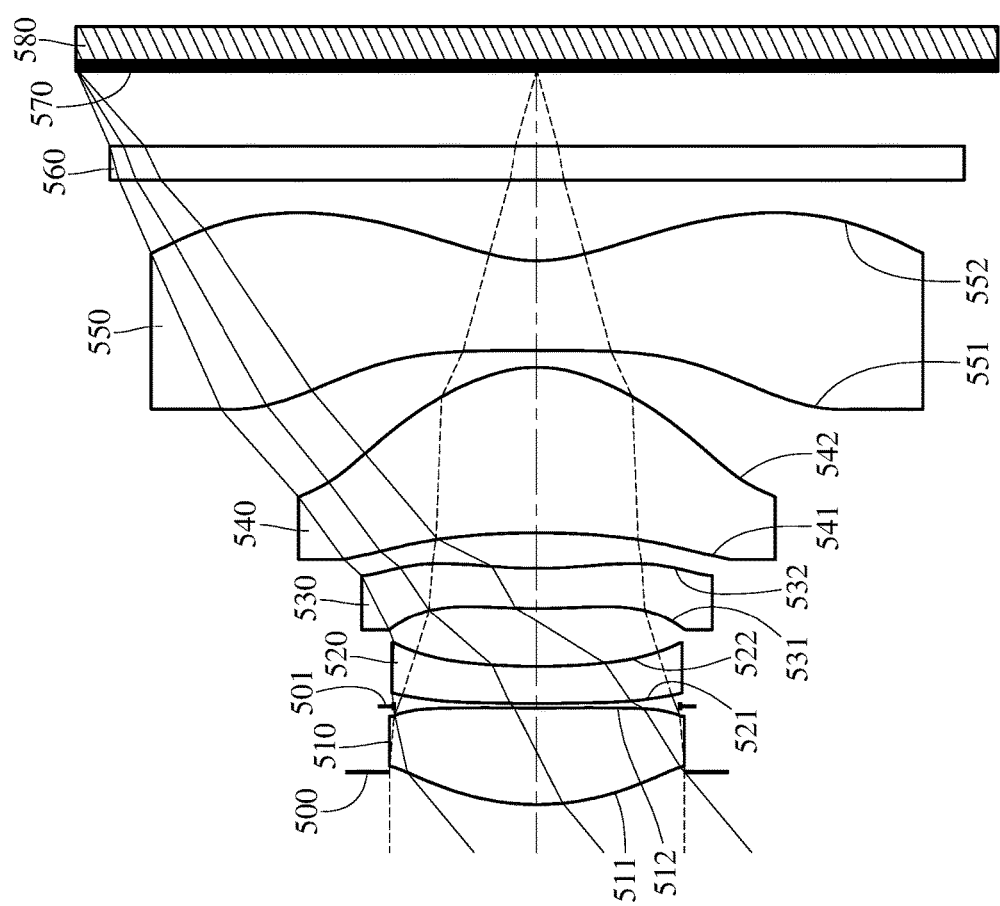
FIG. 9 is a schematic view of an image capturing unit according to the 5th embodiment of the present disclosure.
Figure 10:
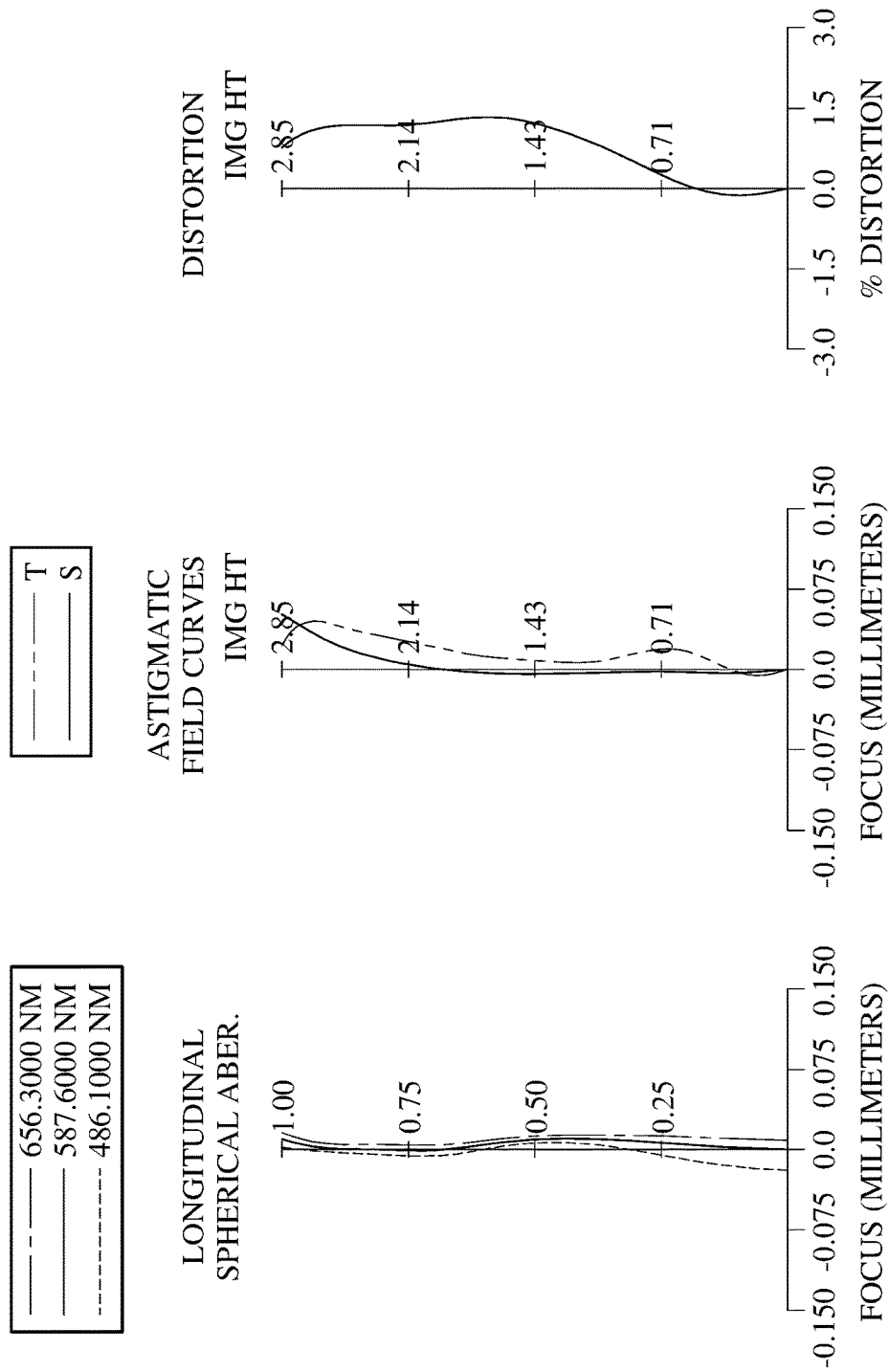
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical photographing lens assembly (its reference numeral is omitted) of the present disclosure and an image sensor 580. The optical photographing lens assembly includes, in order from an object side to an image side, an aperture stop 500, a first lens element 510, a stop 501, a second lens element 520, a third lens element 530, a fourth lens element 540, a fifth lens element 550, an IR-cut filter 560 and an image surface 570. The optical photographing lens assembly includes five lens elements (510, 520, 530, 540, and 550) with no additional lens element disposed between the first lens element 510 and the fifth lens element 550.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The image-side surface 512 of the first lens element 510 has at least one convex critical point in an off-axial region thereof.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has at least one concave critical point in an off-axial region thereof.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The image-side surface 532 of the third lens element 530 has at least one convex critical point in an off-axial region thereof.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one convex critical point in an off-axial region thereof.

The IR-cut filter 560 is made of glass material and located between the fifth lens element 550 and the image surface 570, and will not affect the focal length of the optical photographing lens assembly. The image sensor 580 is disposed on or near the image surface 570 of the optical photographing lens assembly.

The detailed optical data of the 5th embodiment are shown in Table 9 and the aspheric surface data are shown in Table 10 below.

TABLE 9

5th Embodiment
f = 3.40 mm, Fno = 1.86, HFOV = 39.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.202 | | | | |
| 2 | Lens 1 | 1.602 | (ASP) | 0.598 | Plastic | 1.544 | 55.9 | 3.59 |
| 3 | | 7.753 | (ASP) | 0.013 | | | | |
| 4 | Stop | Plano | | 0.016 | | | | |
| 5 | Lens 2 | 6.393 | (ASP) | 0.230 | Plastic | 1.660 | 20.4 | −14.40 |
| 6 | | 3.767 | (ASP) | 0.364 | | | | |
| 7 | Lens 3 | 3.878 | (ASP) | 0.250 | Plastic | 1.660 | 20.4 | −17.92 |
| 8 | | 2.845 | (ASP) | 0.220 | | | | |
| 9 | Lens 4 | −5.101 | (ASP) | 1.028 | Plastic | 1.544 | 55.9 | 1.70 |
| 10 | | −0.839 | (ASP) | 0.104 | | | | |
| 11 | Lens 5 | −100.000 | (ASP) | 0.562 | Plastic | 1.535 | 55.8 | −1.74 |
| 12 | | 0.941 | (ASP) | 0.500 | | | | |

TABLE 9-continued

5th Embodiment
f = 3.40 mm, Fno = 1.86, HFOV = 39.8 deg.

| Surface # | | Curvature Radius | Thickness | Material | Index | Abbe # | Focal Length |
|---|---|---|---|---|---|---|---|
| 13 | IR-cut filter | Plano | 0.210 | Glass | 1.517 | 64.2 | — |
| 14 | | Plano | 0.465 | | | | |
| 15 | Image | Plano | — | | | | |

Note:
Reference wavelength is 587.6 nm (d-line).
An effective radius of the stop 501 (Surface 4) is 0.890 mm.

TABLE 10

| Aspheric Coefficients | | | | | |
|---|---|---|---|---|---|
| Surface # | 2 | 3 | 5 | 6 | 7 |
| k = | −6.5226E+00 | 8.3642E+00 | 1.5385E+01 | −9.9000E+01 | −9.9000E+01 |
| A4 = | 1.8007E−01 | −5.7225E−01 | −5.3445E−01 | 7.5084E−02 | −2.1363E−01 |
| A6 = | −1.6642E−01 | 2.1145E+00 | 2.2723E+00 | 1.2880E−01 | −2.2063E−01 |
| A8 = | 9.1198E−02 | −3.9147E+00 | −3.8667E+00 | 1.7873E−01 | 4.3365E−01 |
| A10 = | −8.6744E−03 | 3.1965E+00 | 2.9783E+00 | −6.0909E−01 | −5.5496E−01 |
| A12 = | −7.5908E−02 | −9.9974E−01 | −8.2763E−01 | 4.0118E−01 | 2.9259E−01 |

| Surface # | 8 | 9 | 10 | 11 | 12 |
|---|---|---|---|---|---|
| k = | −6.1187E+00 | −1.4666E+01 | −8.7893E−01 | −9.9000E+01 | −6.0791E+00 |
| A4 = | −2.7587E−01 | −3.1348E−02 | 3.7357E−01 | −9.8532E−02 | −7.5817E−02 |
| A6 = | 1.4074E−01 | 3.0044E−02 | −5.8481E−01 | −1.1329E−04 | 2.8374E−02 |
| A8 = | −1.3347E−01 | −1.5692E−01 | 7.4865E−01 | 1.5566E−02 | −8.7444E−03 |
| A10 = | 7.8026E−02 | 1.8549E−01 | −6.6382E−01 | −2.7144E−03 | 1.6822E−03 |
| A12 = | 3.1886E−03 | −6.0982E−02 | 3.6918E−01 | −4.1174E−04 | −1.6667E−04 |
| A14 = | — | — | −1.0816E−01 | 1.4728E−04 | 4.4156E−06 |
| A16 = | — | — | 1.2521E−02 | −1.0530E−05 | 2.9667E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.40 | CT4/CT5 | 1.83 |
| Fno | 1.86 | CT4/ΣAT | 1.43 |
| HFOV [deg.] | 39.8 | |f/f2| + |f/f3| | 0.43 |
| V2 + V3 | 40.8 | f2/f3 | 0.80 |
| T23/T34 | 1.65 | f/R9 | −0.03 |
| CT4/(CT2 + CT3) | 2.14 | TL/ImgH | 1.60 |

6th Embodiment

Figure 11:
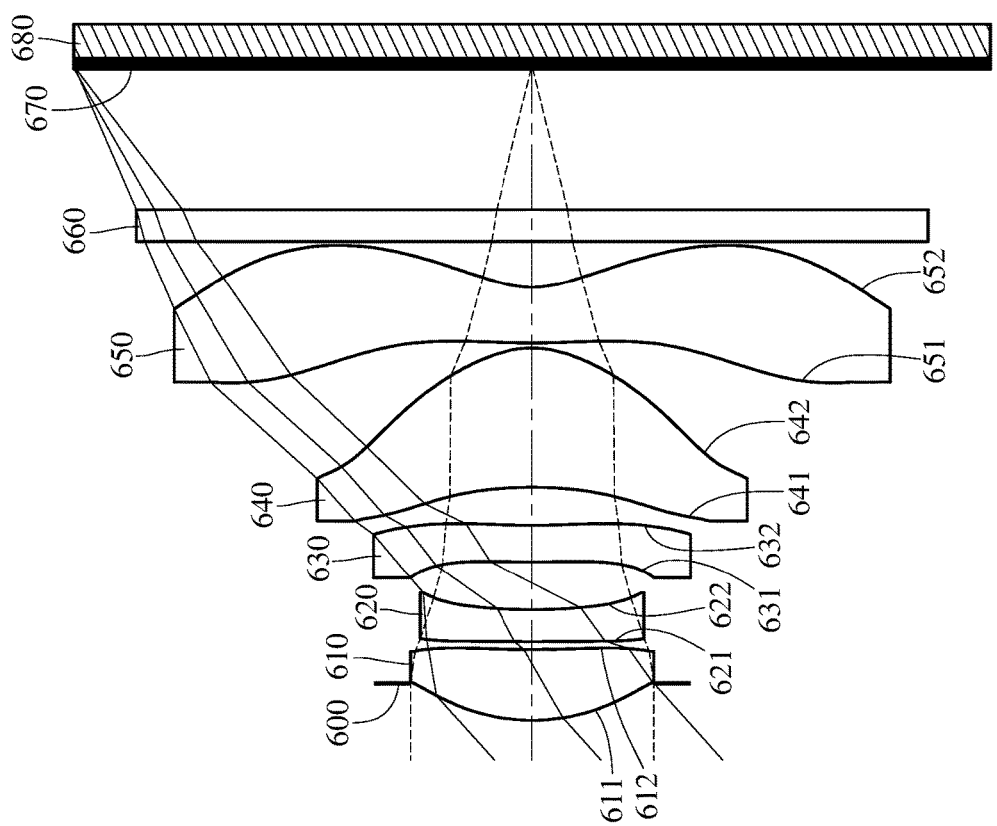
FIG. 11 is a schematic view of an image capturing unit according to the 6th embodiment of the present disclosure.
Figure 12:
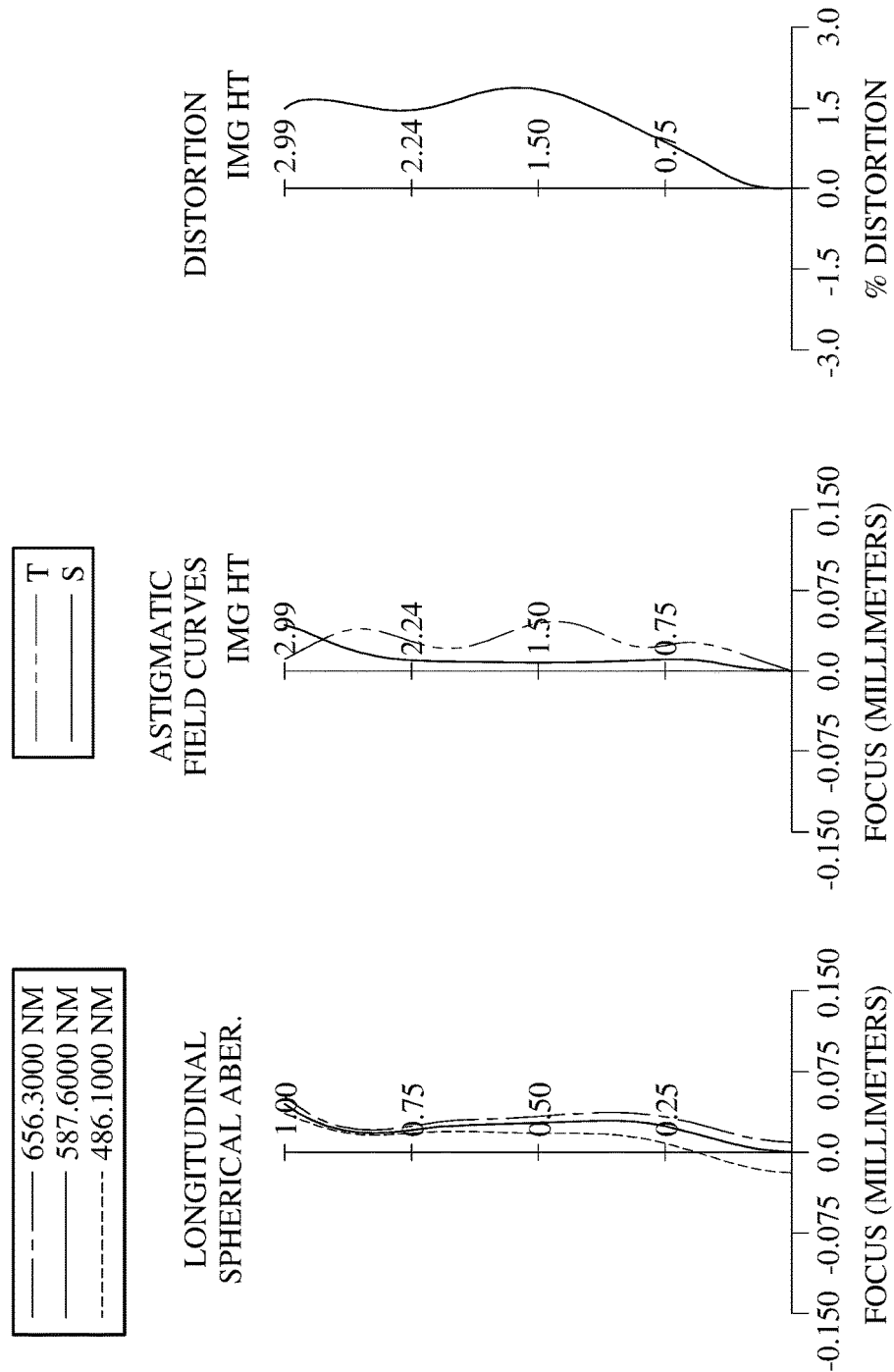
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical photographing lens assembly (its reference numeral is omitted) of the present disclosure and an image sensor 680. The optical photographing lens assembly includes, in order from an object side to an image side, an aperture stop 600, a first lens element 610, a second lens element 620, a third lens element 630, a fourth lens element 640, a fifth lens element 650, an IR-cut filter 660 and an image surface 670. The optical photographing lens assembly includes five lens elements (610, 620, 630, 640, and 650) with no additional lens element disposed between the first lens element 610 and the fifth lens element 650.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The image-side surface 612 of the first lens element 610 has at least one convex critical point in an off-axial region thereof.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has at least one concave critical point in an off-axial region thereof.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The image-side surface 632 of the third lens element 630 has at least one convex critical point in an off-axial region thereof.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least one convex critical point in an off-axial region thereof.

The IR-cut filter 660 is made of glass material and located between the fifth lens element 650 and the image surface 670, and will not affect the focal length of the optical photographing lens assembly. The image sensor 680 is disposed on or near the image surface 670 of the optical photographing lens assembly.

The detailed optical data of the 6th embodiment are shown in Table 11 and the aspheric surface data are shown in Table 12 below.

TABLE 11

6th Embodiment
f = 3.26 mm, Fno = 2.05, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.241 | | | | |
| 2 | Lens 1 | 1.283 | (ASP) | 0.462 | Plastic | 1.544 | 55.9 | 2.97 |
| 3 | | 5.409 | (ASP) | 0.052 | | | | |
| 4 | Lens 2 | 12.939 | (ASP) | 0.210 | Plastic | 1.639 | 23.5 | −8.59 |
| 5 | | 3.830 | (ASP) | 0.314 | | | | |
| 6 | Lens 3 | 8.289 | (ASP) | 0.240 | Plastic | 1.639 | 23.5 | −21.38 |
| 7 | | 5.100 | (ASP) | 0.249 | | | | |
| 8 | Lens 4 | −2.685 | (ASP) | 0.910 | Plastic | 1.544 | 55.9 | 1.31 |
| 9 | | −0.632 | (ASP) | 0.033 | | | | |
| 10 | Lens 5 | 5.081 | (ASP) | 0.365 | Plastic | 1.535 | 55.7 | −1.42 |
| 11 | | 0.643 | (ASP) | 0.300 | | | | |
| 12 | IR-cut filter | Plano | | 0.210 | Glass | 1.517 | 64.2 | — |
| 13 | | Plano | | 0.917 | | | | |
| 14 | Image | Plano | | — | | | | |

Note:
Reference wavelength is 587.6 nm (d-line).
An effective radius of the image-side surface 622 (Surface 5) is 0.712 mm.

TABLE 12

Aspheric Coefficients

| Surface # | 2 | 3 | 4 | 5 | 6 |
|---|---|---|---|---|---|
| k = | −2.7154E+00 | 9.6813E+00 | 9.0000E+01 | 2.4441E+01 | −4.2381E+01 |
| A4 = | 1.4743E−01 | −2.6604E−01 | −2.7044E−01 | −8.4416E−02 | −3.8183E−01 |
| A6 = | 1.0212E−01 | 1.4233E−01 | 6.3687E−01 | 6.6763E−02 | 5.5332E−01 |
| A8 = | −6.6802E−01 | 8.3564E−01 | 4.0140E−01 | 3.0722E+00 | −1.7708E+00 |
| A10 = | 1.4936E+00 | −2.8883E+00 | −2.8359E+00 | −1.2811E+01 | 2.9674E+00 |
| A12 = | −1.7246E+00 | 2.9645E+00 | 3.6111E+00 | 2.2791E+01 | −2.8451E+00 |
| A14 = | 4.0923E−01 | −1.0545E+00 | −1.2021E+00 | −1.5609E+01 | 9.6817E−01 |

| Surface # | 7 | 8 | 9 | 10 | 11 |
|---|---|---|---|---|---|
| k = | −2.2054E+01 | −3.1417E+01 | −4.0809E+00 | −9.9000E+01 | −6.0043E+00 |
| A4 = | −2.9730E−01 | −3.1180E−01 | −3.0830E−01 | −1.4829E−01 | −1.2777E−01 |
| A6 = | 5.9147E−01 | 5.6324E−01 | 2.2770E−01 | 5.0650E−02 | 6.8555E−02 |
| A8 = | −1.4571E+00 | −1.2642E+00 | −3.3924E−02 | −2.7591E−03 | −3.0072E−02 |
| A10 = | 2.5587E+00 | 2.3410E+00 | −2.4853E−01 | −1.6058E−03 | 8.6387E−03 |
| A12 = | −2.7207E+00 | −2.3260E+00 | 3.1546E−01 | 3.6884E−04 | −1.5140E−03 |
| A14 = | 1.5737E+00 | 1.1503E+00 | −1.3970E−01 | −3.0823E−05 | 1.4649E−04 |
| A16 = | −3.8150E−01 | −2.2826E−01 | 2.0966E−02 | 8.7886E−07 | −5.9283E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.26 | CT4/CT5 | 2.49 |
| Fno | 2.05 | CT4/ΣAT | 1.40 |

-continued

| 6th Embodiment | | | |
|---|---|---|---|
| HFOV [deg.] | 42.0 | \|f/f2\| + \|f/f3\| | 0.53 |
| V2 + V3 | 47.0 | f2/f3 | 0.40 |
| T23/T34 | 1.26 | f/R9 | 0.64 |
| CT4/(CT2 + CT3) | 2.02 | TL/ImgH | 1.42 |

7th Embodiment

Figure 13:
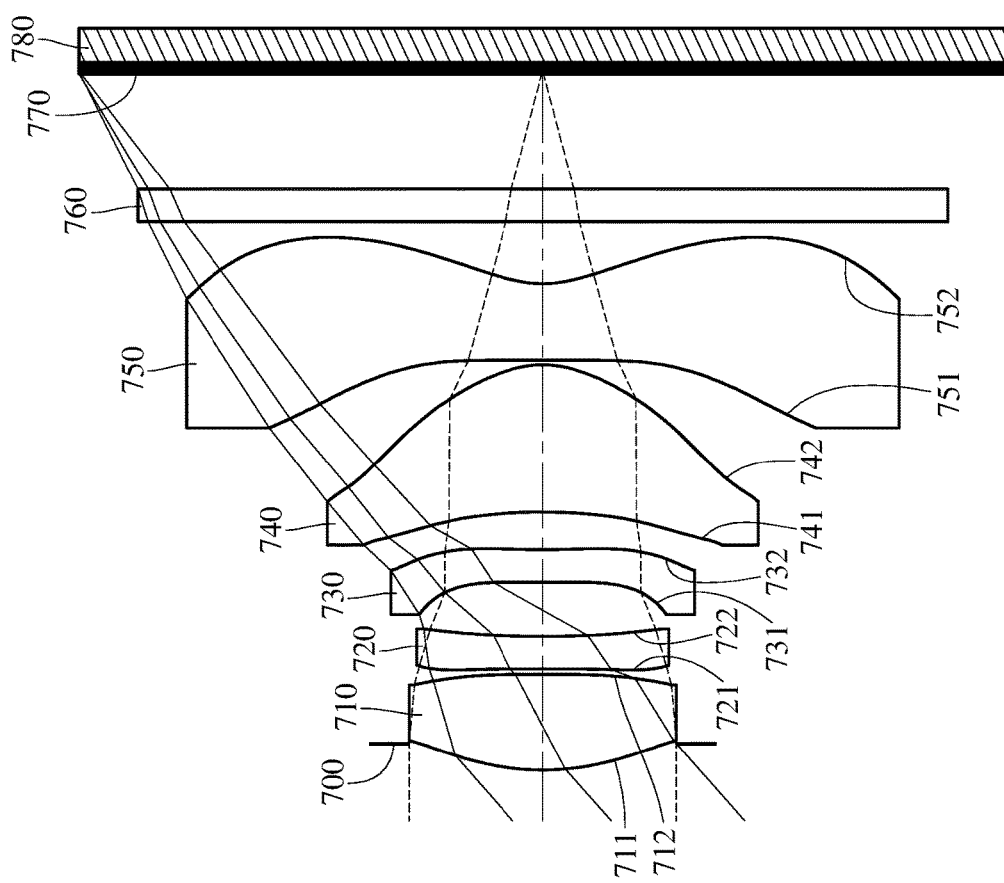
FIG. 13 a schematic view of an image capturing unit according to the 7th embodiment of the present disclosure.
Figure 14:
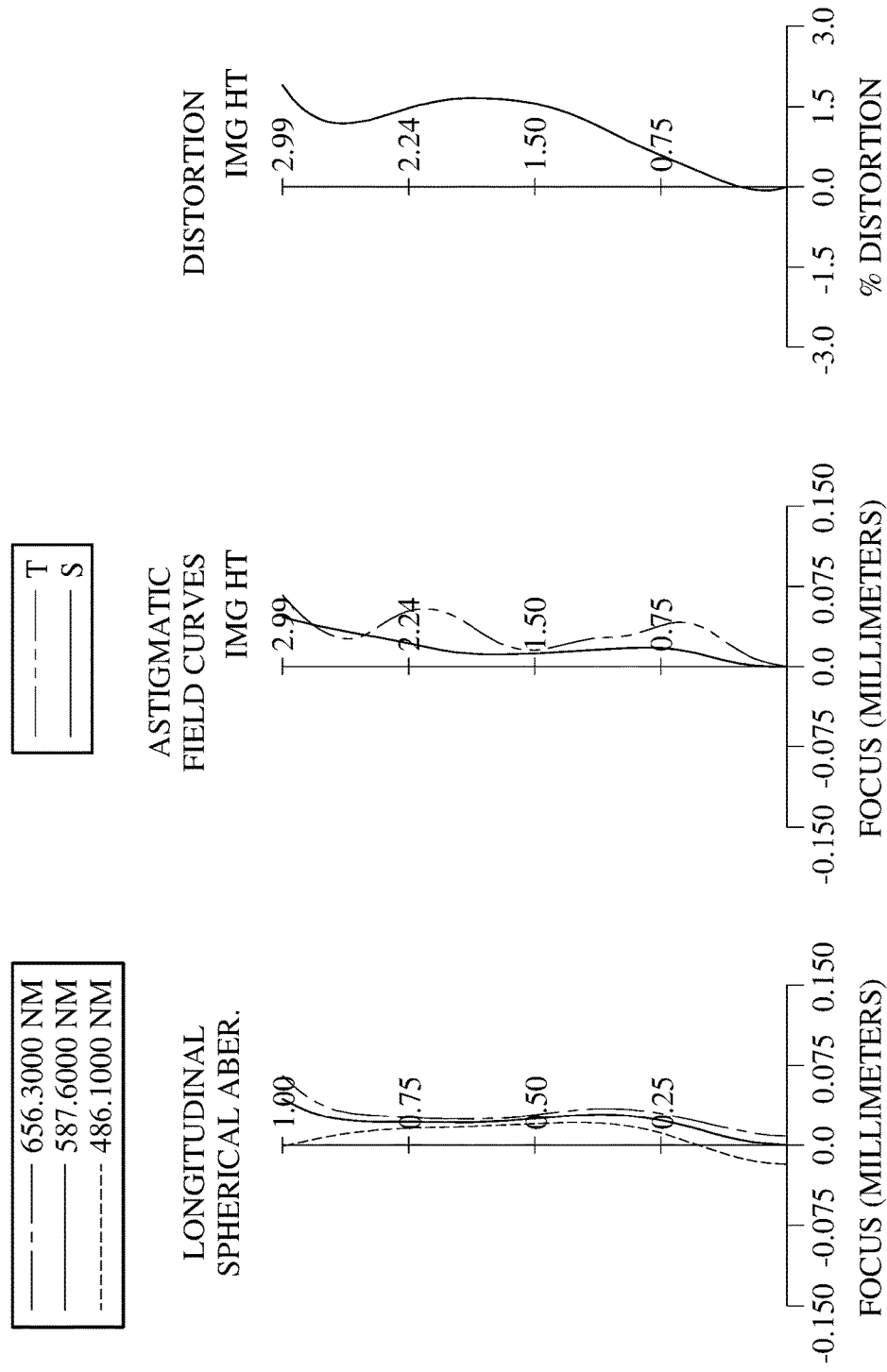
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical photographing lens assembly (its reference numeral is omitted) of the present disclosure and an image sensor 780. The optical photographing lens assembly includes, in order from an object side to an image side, an aperture stop 700, a first lens element 710, a second lens element 720, a third lens element 730, a fourth lens element 740, a fifth lens element 750, an IR-cut filter 760 and an image surface 770. The optical photographing lens assembly includes five lens elements (710, 720, 730, 740, and 750) with no additional lens element disposed between the first lens element 710 and the fifth lens element 750.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The image-side surface 712 of the first lens element 710 has at least one convex critical point in an off-axial region thereof.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has at least one concave critical point in an off-axial region thereof.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The image-side surface 732 of the third lens element 730 has at least one convex critical point in an off-axial region thereof.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has at least one convex critical point in an off-axial region thereof.

The IR-cut filter 760 is made of glass material and located between the fifth lens element 750 and the image surface 770, and will not affect the focal length of the optical photographing lens assembly. The image sensor 780 is disposed on or near the image surface 770 of the optical photographing lens assembly.

The detailed optical data of the 7th embodiment are shown in Table 13 and the aspheric surface data are shown in Table 14 below.

TABLE 13

7th Embodiment
f = 3.31 mm, Fno = 1.92, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.171 | | | | |
| 2 | Lens 1 | 1.682 | (ASP) | 0.619 | Plastic | 1.545 | 56.0 | 3.26 |
| 3 | | 27.941 | (ASP) | 0.035 | | | | |
| 4 | Lens 2 | 16.183 | (ASP) | 0.210 | Plastic | 1.614 | 26.0 | −13.25 |
| 5 | | 5.386 | (ASP) | 0.350 | | | | |
| 6 | Lens 3 | 13.064 | (ASP) | 0.210 | Plastic | 1.671 | 19.3 | −12.70 |
| 7 | | 5.124 | (ASP) | 0.242 | | | | |
| 8 | Lens 4 | −3.607 | (ASP) | 0.954 | Plastic | 1.544 | 55.9 | 1.31 |
| 9 | | −0.648 | (ASP) | 0.030 | | | | |
| 10 | Lens 5 | −100.000 | (ASP) | 0.493 | Plastic | 1.534 | 55.9 | −1.34 |
| 11 | | 0.721 | (ASP) | 0.400 | | | | |
| 12 | IR-cut filter | Plano | | 0.210 | Glass | 1.517 | 64.2 | — |
| 13 | | Plano | | 0.747 | | | | |
| 14 | Image | Plano | | — | | | | |

Note:
Reference wavelength is 587.6 nm (d-line).
An effective radius of the image-side surface 722 (Surface 5) is 0.770 mm.

TABLE 14

Aspheric Coefficients

| Surface # | 2 | 3 | 4 | 5 | 6 |
|---|---|---|---|---|---|
| k = | −5.7273E+00 | 9.6813E+00 | 9.0000E+01 | −7.3826E+01 | −4.2638E+01 |
| A4 = | 1.2341E−01 | −5.8864E−01 | −6.1378E−01 | −1.3359E−01 | −5.7837E−01 |
| A6 = | −1.0621E−01 | 1.7362E+00 | 2.4100E+00 | 7.2746E−01 | 8.6901E−01 |
| A8 = | −6.8417E−02 | −3.1584E+00 | −4.4199E+00 | −1.0768E+00 | −4.1842E+00 |
| A10 = | 2.4418E−01 | 3.0911E+00 | 4.6560E+00 | 1.7856E+00 | 1.1183E+01 |
| A12 = | −4.5578E−01 | −1.4373E+00 | −2.3418E+00 | 9.8108E−01 | −1.5919E+01 |
| A14 = | 2.5444E−01 | 2.3861E−01 | 4.8263E−01 | −7.9928E−01 | 8.3828E+00 |

| Surface # | 7 | 8 | 9 | 10 | 11 |
|---|---|---|---|---|---|
| k = | −2.2054E+01 | −3.1417E+01 | −3.3861E+00 | −1.0000E+00 | −6.0099E+00 |
| A4 = | −3.9345E−01 | −1.4875E−01 | −1.1478E−01 | 1.2986E−02 | −8.9270E−02 |
| A6 = | 3.8599E−01 | 3.8844E−01 | −1.5997E−01 | −2.9648E−01 | 2.8406E−02 |
| A8 = | −1.2889E+00 | −1.6925E+00 | 3.9763E−01 | 3.5025E−01 | −4.8583E−03 |
| A10 = | 3.4023E+00 | 3.5831E+00 | −5.3447E−01 | −2.0521E−01 | −3.0168E−04 |
| A12 = | −4.6574E+00 | −3.6840E+00 | 4.1239E−01 | 6.7025E−02 | 2.5513E−04 |
| A14 = | 3.0485E+00 | 1.8677E+00 | −1.4989E−01 | −1.1517E−02 | −3.9419E−05 |
| A16 = | −7.1845E−01 | −3.7925E−01 | 1.9695E−02 | 8.0836E−04 | 2.1728E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.31 | CT4/CT5 | 1.94 |
| Fno | 1.92 | CT4/ΣAT | 1.45 |
| HFOV [deg.] | 41.5 | \|f/f2\| + \|f/f3\| | 0.51 |
| V2 + V3 | 45.3 | f2/f3 | 1.04 |
| T23/T34 | 1.45 | f/R9 | −0.03 |
| CT4/(CT2 + CT3) | 2.27 | TL/ImgH | 1.50 |

8th Embodiment

Figure 15:
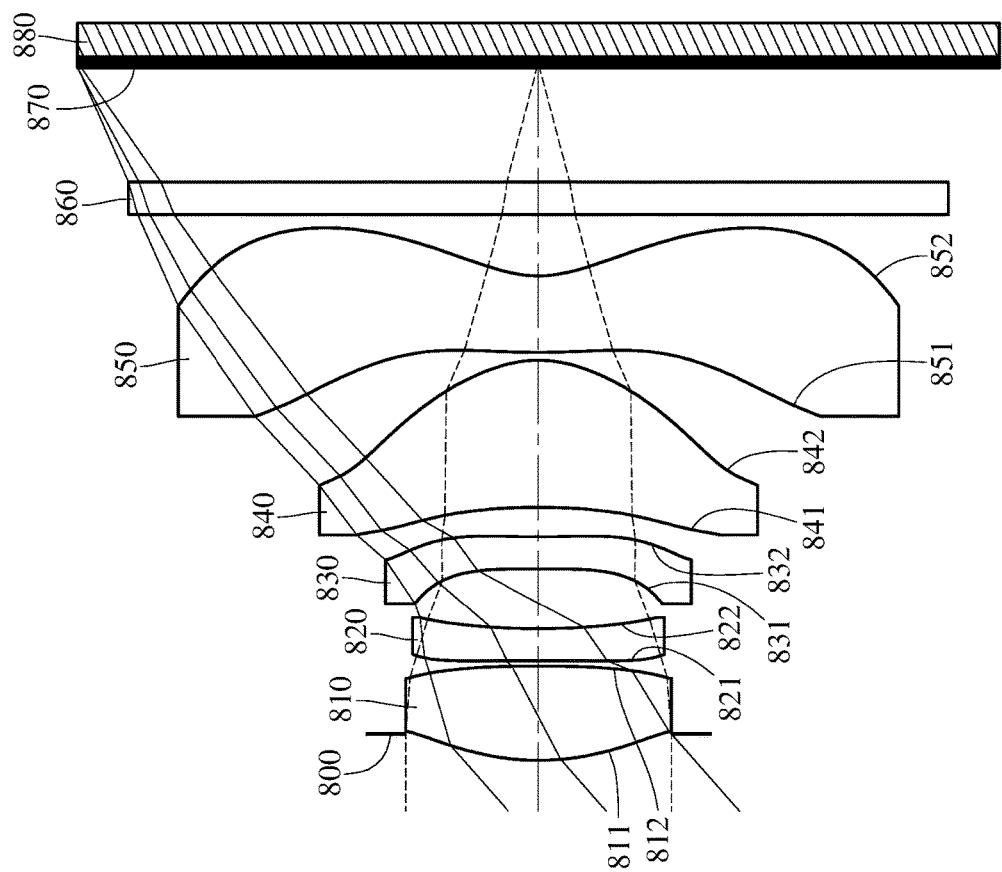
FIG. 15 a schematic view of an image capturing unit according to the 8th embodiment of the present disclosure.
Figure 16:
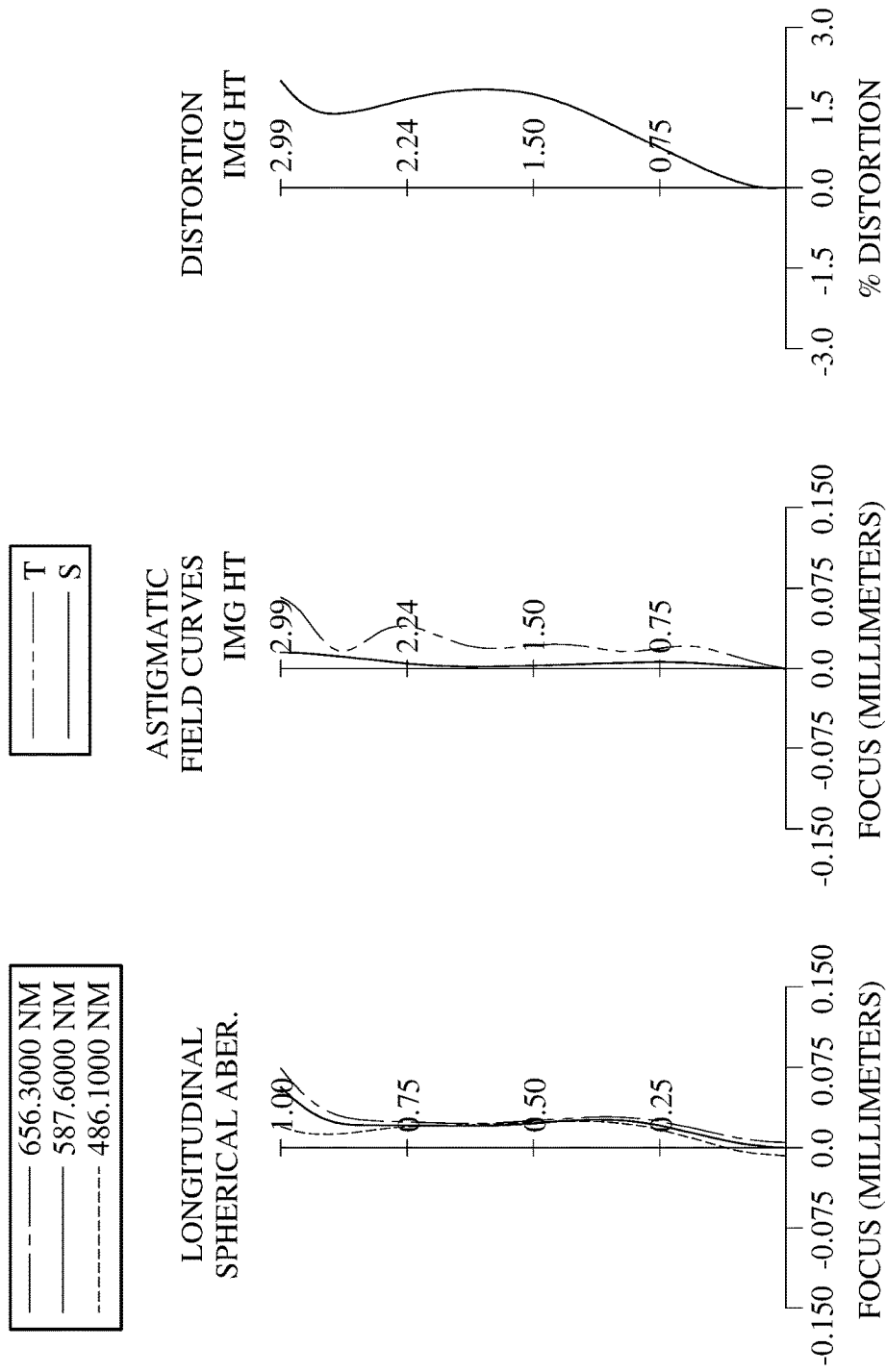
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical photographing lens assembly (its reference numeral is omitted) of the present disclosure and an image sensor 880. The optical photographing lens assembly includes, in order from an object side to an image side, an aperture stop 800, a first lens element 810, a second lens element 820, a third lens element 830, a fourth lens element 840, a fifth lens element 850, an IR-cut filter 860 and an image surface 870. The optical photographing lens assembly includes five lens elements (810, 820, 830, 840, and 850) with no additional lens element disposed between the first lens element 810 and the fifth lens element 850.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has at least one concave critical point in an off-axial region thereof.

The third lens element 830 with negative refractive power has an object-side surface 831 being planar in a paraxial region thereof and an image-side surface 832 being concave in a paraxial region thereof. The third lens element 830 is made of plastic material and has the object-side surface 831 and the image-side surface 832 being both aspheric. The image-side surface 832 of the third lens element 830 has at least one convex critical point in an off-axial region thereof.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one convex critical point in an off-axial region thereof.

The IR-cut filter 860 is made of glass material and located between the fifth lens element 850 and the image surface 870, and will not affect the focal length of the optical photographing lens assembly. The image sensor 880 is disposed on or near the image surface 870 of the optical photographing lens assembly.

The detailed optical data of the 8th embodiment are shown in Table 15 and the aspheric surface data are shown in Table 16 below.

TABLE 15

8th Embodiment
f = 3.31 mm, Fno = 1.92, HFOV = 41.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.170 | | | | |
| 2 | Lens 1 | 1.674 | (ASP) | 0.610 | Plastic | 1.545 | 56.0 | 2.85 |
| 3 | | −18.857 | (ASP) | 0.035 | | | | |
| 4 | Lens 2 | 37.403 | (ASP) | 0.210 | Plastic | 1.634 | 23.8 | −8.52 |
| 5 | | 4.709 | (ASP) | 0.390 | | | | |
| 6 | Lens 3 | ∞ | (ASP) | 0.210 | Plastic | 1.671 | 19.3 | −9.14 |
| 7 | | 6.131 | (ASP) | 0.191 | | | | |
| 8 | Lens 4 | −3.754 | (ASP) | 0.954 | Plastic | 1.544 | 55.9 | 1.59 |
| 9 | | −0.764 | (ASP) | 0.052 | | | | |
| 10 | Lens 5 | 5.087 | (ASP) | 0.499 | Plastic | 1.515 | 56.5 | −1.75 |
| 11 | | 0.739 | (ASP) | 0.400 | | | | |
| 12 | IR-cut filter | Plano | | 0.210 | Glass | 1.517 | 64.2 | — |
| 13 | | Plano | | 0.739 | | | | |
| 14 | Image | Plano | | — | | | | |

Note:
Reference wavelength is 587.6 nm (d-line).
An effective radius of the image-side surface 822 (Surface 5) is 0.770 mm.

TABLE 16

Aspheric Coefficients

| Surface # | 2 | 3 | 4 | 5 | 6 |
|---|---|---|---|---|---|
| k = | −6.1493E+00 | 9.6813E+00 | 9.0000E+01 | −1.1912E+01 | 0.0000E+00 |
| A4 = | 1.2507E−01 | −2.7323E−01 | −2.3016E−01 | −4.9295E−02 | −5.0335E−01 |
| A6 = | −4.6340E−02 | 7.3411E−01 | 1.1029E+00 | 3.3666E−01 | 9.6785E−02 |
| A8 = | −3.2940E−01 | −1.3939E+00 | −2.0484E+00 | −3.7749E−01 | −2.3602E−01 |
| A10 = | 7.2723E−01 | 1.2689E+00 | 2.2587E+00 | −1.3838E−01 | 2.8013E−01 |
| A12 = | −8.8029E−01 | −4.5865E−01 | −1.1521E+00 | 5.6934E−01 | −7.8069E−01 |
| A14 = | 3.8928E−01 | 2.1931E−02 | 2.8872E−01 | −2.9431E−01 | 5.2171E−01 |

| Surface # | 7 | 8 | 9 | 10 | 11 |
|---|---|---|---|---|---|
| k = | −2.2054E+01 | −3.1417E+01 | −3.4377E+00 | −1.0000E+00 | −4.9567E+00 |
| A4 = | −3.5474E−01 | −3.9556E−02 | −1.2936E−01 | −1.8374E−01 | −1.1981E−01 |
| A6 = | 2.7322E−02 | −1.8499E−02 | −1.0129E−01 | −2.2147E−02 | 5.7700E−02 |
| A8 = | 5.0307E−02 | −6.4326E−01 | 3.1903E−01 | 1.0309E−01 | −2.1178E−02 |
| A10 = | 2.1805E−01 | 1.7885E+00 | −4.3718E−01 | −6.7368E−02 | 5.0884E−03 |
| A12 = | −3.4668E−01 | −1.8697E+00 | 3.3443E−01 | 2.1654E−02 | −7.7804E−04 |
| A14 = | 1.9379E−01 | 9.0427E−01 | −1.2108E−01 | −3.5101E−03 | 6.6329E−05 |
| A16 = | −1.2742E−02 | −1.7155E−01 | 1.6188E−02 | 2.2728E−04 | −2.3584E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.31 | CT4/CT5 | 1.91 |
| Fno | 1.92 | CT4/ΣAT | 1.43 |
| HFOV [deg.] | 41.4 | $|f/f2| + |f/f3|$ | 0.75 |
| V2 + V3 | 43.1 | f2/f3 | 0.93 |
| T23/T34 | 2.04 | f/R9 | 0.65 |
| CT4/(CT2 + CT3) | 2.27 | TL/ImgH | 1.50 |

9th Embodiment

Figure 17:
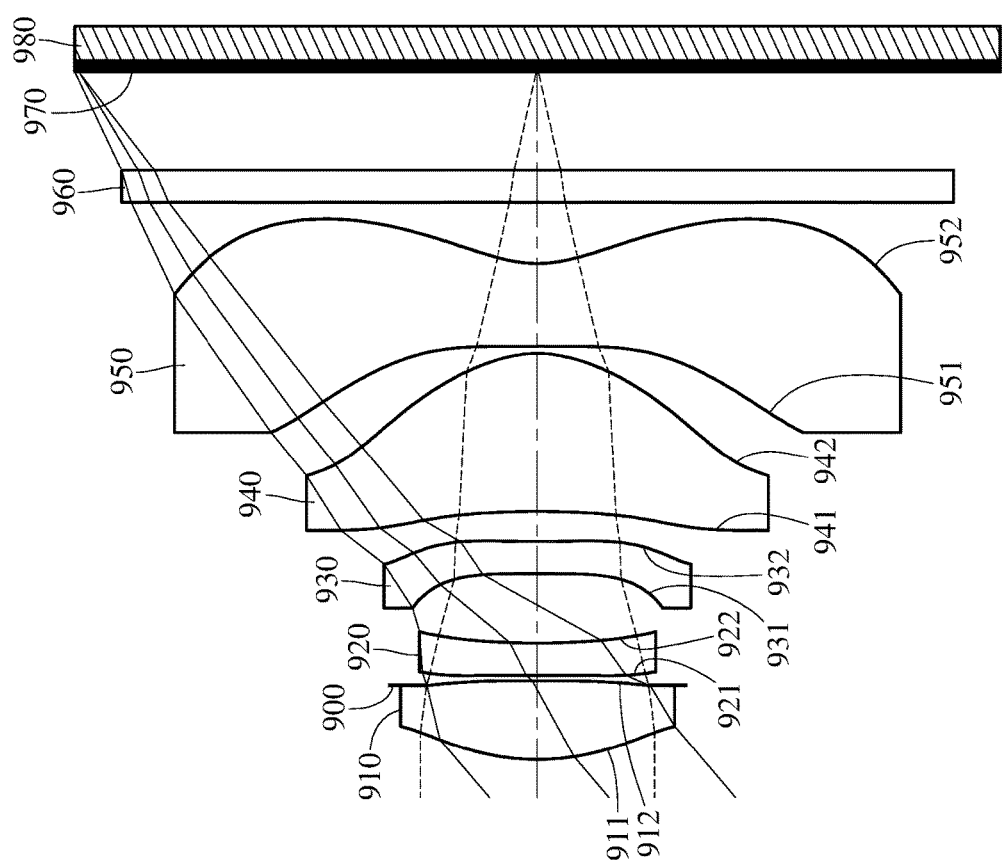
FIG. 17 a schematic view of an image capturing unit according to the 9th embodiment of the present disclosure.
Figure 18:
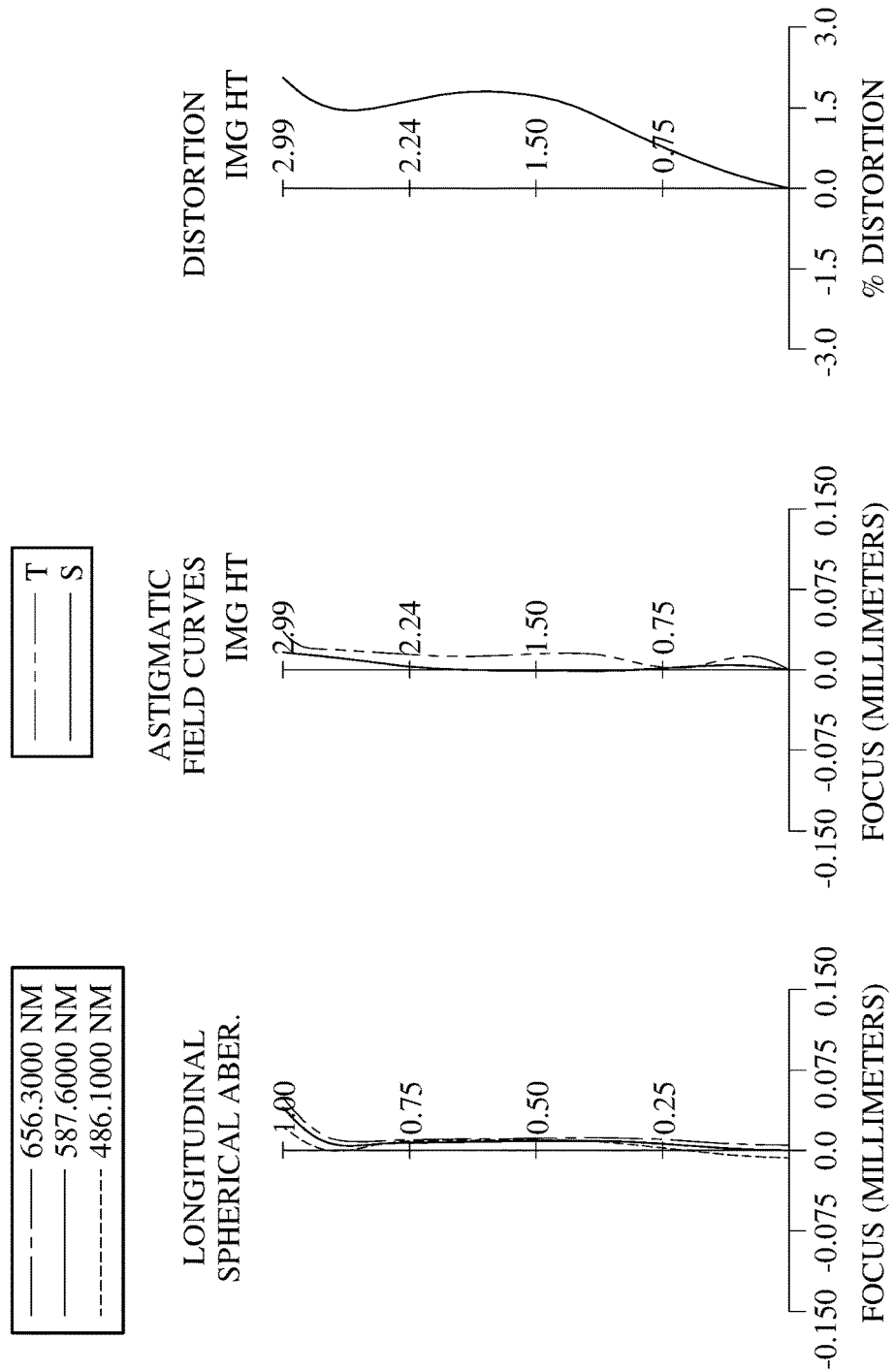
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical photographing lens assembly (its reference numeral is omitted) of the present disclosure and an image sensor 980. The optical photographing lens assembly includes, in order from an object side to an image side, a first lens element 910, an aperture stop 900, a second lens element 920, a third lens element 930, a fourth lens element 940, a fifth lens element 950, an IR-cut filter 960 and an image surface 970. The optical photographing lens assembly includes five lens elements (910, 920, 930, 940, and 950) with no additional lens element disposed between the first lens element 910 and the fifth lens element 950.

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has at least one concave critical point in an off-axial region thereof.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The image-side surface 932 of the third lens element 930 has at least one convex critical point in an off-axial region thereof.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The image-side surface 952 of the fifth lens element 950 has at least one convex critical point in an off-axial region thereof.

The IR-cut filter 960 is made of glass material and located between the fifth lens element 950 and the image surface 970, and will not affect the focal length of the optical photographing lens assembly. The image sensor 980 is disposed on or near the image surface 970 of the optical photographing lens assembly.

The detailed optical data of the 9th embodiment are shown in Table 17 and the aspheric surface data are shown in Table 18 below.

TABLE 17

9th Embodiment
f = 3.44 mm, Fno = 2.25, HFOV = 40.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.550 | (ASP) | 0.517 | Plastic | 1.545 | 56.0 | 2.78 |
| 2 | | −56.866 | (ASP) | −0.030 | | | | |
| 3 | Ape. Stop | Plano | | 0.065 | | | | |
| 4 | Lens 2 | 83.423 | (ASP) | 0.210 | Plastic | 1.634 | 23.8 | −7.92 |
| 5 | | 4.734 | (ASP) | 0.453 | | | | |
| 6 | Lens 3 | 86.410 | (ASP) | 0.210 | Plastic | 1.671 | 19.3 | −10.86 |
| 7 | | 6.715 | (ASP) | 0.197 | | | | |
| 8 | Lens 4 | −5.426 | (ASP) | 1.035 | Plastic | 1.544 | 55.9 | 1.58 |
| 9 | | −0.791 | (ASP) | 0.046 | | | | |
| 10 | Lens 5 | 54.423 | (ASP) | 0.541 | Plastic | 1.515 | 56.5 | −1.57 |
| 11 | | 0.793 | (ASP) | 0.400 | | | | |
| 12 | IR-cut filter | Plano | | 0.210 | Glass | 1.517 | 64.2 | — |
| 13 | | Plano | | 0.644 | | | | |
| 14 | Image | Plano | | — | | | | |

Note:
Reference wavelength is 587.6 nm (d-line).

TABLE 18

Aspheric Coefficients

| Surface # | 1 | 2 | 4 | 5 | 6 |
|---|---|---|---|---|---|
| k = | −5.1773E+00 | 9.6813E+00 | 9.0000E+01 | −8.8319E+00 | 0.0000E+00 |
| A4 = | 1.3976E−01 | −2.5804E−01 | −2.1058E−01 | −4.1475E−02 | −3.8230E−01 |
| A6 = | −5.3487E−02 | 7.6348E−01 | 1.0295E+00 | 3.8982E−01 | −5.8296E−01 |
| A8 = | −3.0611E−01 | −1.8265E+00 | −2.0638E+00 | −8.7188E−01 | 3.1442E+00 |
| A10 = | 6.8140E−01 | 2.9350E+00 | 2.7720E+00 | 1.2095E+00 | −8.9637E+00 |
| A12 = | −9.5470E−01 | −3.0259E+00 | −1.7692E+00 | −9.5614E−01 | 1.1836E+01 |
| A14 = | 5.0238E−01 | 1.5328E+00 | 4.5884E−01 | 2.9420E−01 | −6.2151E+00 |

| Surface # | 7 | 8 | 9 | 10 | 11 |
|---|---|---|---|---|---|
| k = | −2.2054E+01 | −3.1417E+01 | −4.2951E+00 | −1.0000E+00 | −5.4135E+00 |
| A4 = | −2.6597E−01 | 5.3830E−02 | −2.1492E−01 | −1.3369E−01 | −1.1829E−01 |
| A6 = | −5.0979E−01 | −4.4465E−01 | 1.7704E−01 | −1.6016E−01 | 5.7944E−02 |
| A8 = | 2.1256E+00 | 6.8017E−01 | −2.2490E−01 | 2.7875E−01 | −2.0858E−02 |
| A10 = | −4.3139E+00 | −3.8557E−01 | 2.2529E−01 | −1.7897E−01 | 4.9222E−03 |

TABLE 18-continued

| Aspheric Coefficients | | | | | |
|---|---|---|---|---|---|
| A12 = | 5.0471E+00 | 3.9873E−02 | −1.1196E−01 | 5.9285E−02 | −7.5627E−04 |
| A14 = | −3.0789E+00 | 4.0479E−02 | 2.7448E−02 | −9.9092E−03 | 6.7215E−05 |
| A16 = | 7.8181E−01 | −1.1585E−02 | −2.7742E−03 | 6.5574E−04 | −2.5874E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.44 | CT4/CT5 | 1.91 |
| Fno | 2.25 | CT4/ΣAT | 1.42 |
| HFOV [deg.] | 40.4 | \|f/f2\| + \|f/f3\| | 0.75 |
| V2 + V3 | 43.1 | f2/f3 | 0.73 |
| T23/T34 | 2.30 | f/R9 | 0.06 |
| CT4/(CT2 + CT3) | 2.46 | TL/ImgH | 1.50 |

10th Embodiment

Figure 19:
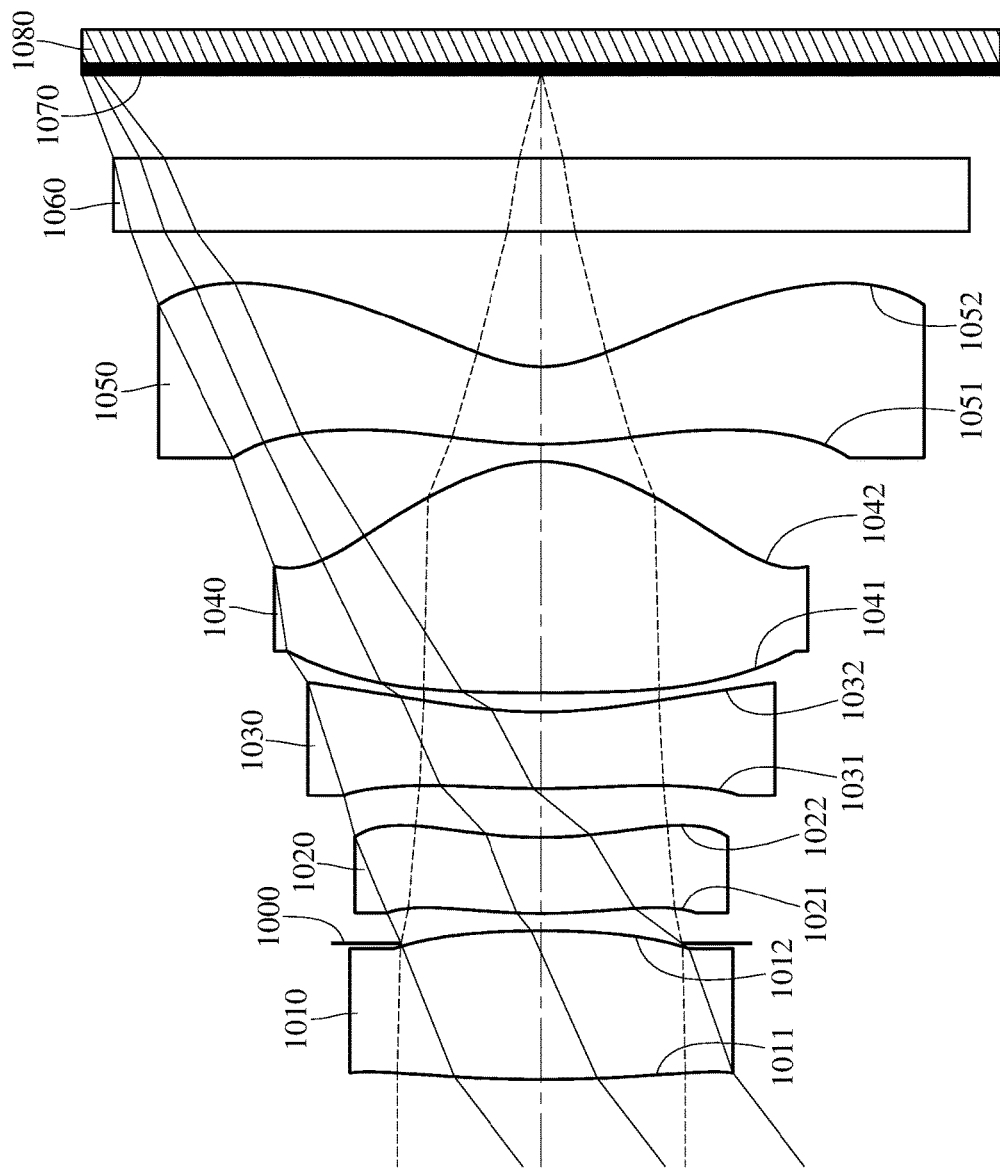
FIG. 19 a schematic view of an image capturing unit according to the 10th embodiment of the present disclosure.
Figure 20:
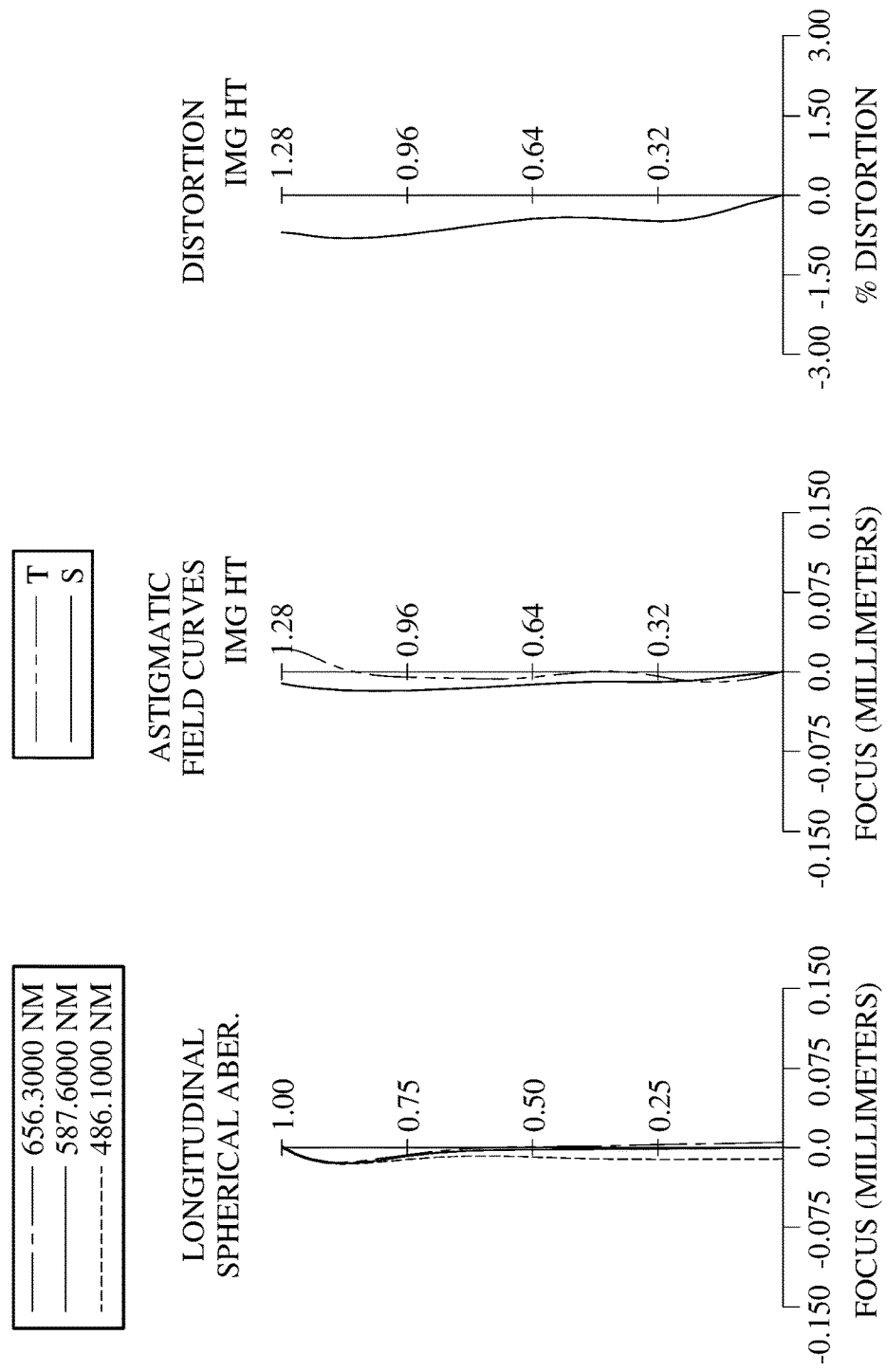
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical photographing lens assembly (its reference numeral is omitted) of the present disclosure and an image sensor 1080. The optical photographing lens assembly includes, in order from an object side to an image side, a first lens element 1010, an aperture stop 1000, a second lens element 1020, a third lens element 1030, a fourth lens element 1040, a fifth lens element 1050, an IR-cut filter 1060 and an image surface 1070. The optical photographing lens assembly includes five lens elements (1010, 1020, 1030, 1040, and 1050) with no additional lens element disposed between the first lens element 1010 and the fifth lens element 1050.

The first lens element 1010 with positive refractive power has an object-side surface 1011 being convex in a paraxial region thereof and an image-side surface 1012 being convex in a paraxial region thereof. The first lens element 1010 is made of plastic material and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric. The object-side surface 1021 of the second lens element 1020 has at least one concave critical point in an off-axial region thereof.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The image-side surface 1032 of the third lens element 1030 has at least one convex critical point in an off-axial region thereof.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. The image-side surface 1052 of the fifth lens element 1050 has at least one convex critical point in an off-axial region thereof.

The IR-cut filter 1060 is made of glass material and located between the fifth lens element 1050 and the image surface 1070, and will not affect the focal length of the optical photographing lens assembly. The image sensor 1080 is disposed on or near the image surface 1070 of the optical photographing lens assembly.

The detailed optical data of the 10th embodiment are shown in Table 19 and the aspheric surface data are shown in Table 20 below.

TABLE 19

10th Embodiment
f = 1.69 mm, Fno = 2.05, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.986 | (ASP) | 0.426 | Plastic | 1.544 | 55.9 | 3.19 |
| 2 | | −2.955 | (ASP) | −0.036 | | | | |
| 3 | Ape. Stop | Plano | | 0.086 | | | | |
| 4 | Lens 2 | 1.701 | (ASP) | 0.220 | Plastic | 1.640 | 23.3 | −10.34 |
| 5 | | 1.284 | (ASP) | 0.140 | | | | |

TABLE 19-continued

10th Embodiment
f = 1.69 mm, Fno = 2.05, HFOV = 37.5 deg.

| Surface # | | Curvature Radius | | Thickness | Material | Index | Abbe # | Focal Length |
|---|---|---|---|---|---|---|---|---|
| 6 | Lens 3 | 2.700 | (ASP) | 0.220 | Plastic | 1.640 | 23.3 | −4.97 |
| 7 | | 1.413 | (ASP) | 0.055 | | | | |
| 8 | Lens 4 | 8.610 | (ASP) | 0.665 | Plastic | 1.544 | 55.9 | 0.75 |
| 9 | | −0.416 | (ASP) | 0.050 | | | | |
| 10 | Lens 5 | 1.385 | (ASP) | 0.222 | Plastic | 1.544 | 55.9 | −0.92 |
| 11 | | 0.348 | (ASP) | 0.390 | | | | |
| 12 | IR-cut filter | Plano | | 0.210 | Glass | 1.517 | 64.2 | — |
| 13 | | Plano | | 0.239 | | | | |
| 14 | Image | Plano | | — | | | | |

Note:
Reference wavelength is 587.6 nm (d-line).

TABLE 20

Aspheric Coefficients

| Surface # | 1 | 2 | 4 | 5 | 6 |
|---|---|---|---|---|---|
| k = | −2.1685E+00 | 1.2919E+01 | −1.6063E+01 | −7.5198E+00 | 0.0000E+00 |
| A4 = | −4.0852E−02 | −8.1076E−01 | −9.4632E−01 | −4.9630E−01 | −1.0047E+00 |
| A6 = | −4.9555E−01 | 3.7990E+00 | 2.8212E−01 | −2.7259E+00 | 2.9896E−01 |
| A8 = | 1.5281E+00 | −2.0649E+01 | −2.6343E+00 | 1.0865E+00 | 1.3807E+00 |
| A10 = | −3.4500E+00 | 4.2573E+01 | −3.1236E+01 | −3.4113E+01 | 1.6193E+01 |
| A12 = | −8.0041E+00 | −1.4866E+01 | 3.2184E+01 | 1.7883E+01 | −5.1062E+01 |
| A14 = | 7.6949E−01 | 1.2164E+01 | −3.6777E+01 | −9.3253E+00 | — |

| Surface # | 7 | 8 | 9 | 10 | 11 |
|---|---|---|---|---|---|
| k = | 0.0000E+00 | −3.9045E+01 | −3.7540E+00 | 0.0000E+00 | −4.1571E+00 |
| A4 = | −7.3244E−01 | 2.9795E−01 | −6.7700E−01 | −1.0909E+00 | −5.2035E−01 |
| A6 = | 1.1922E+00 | 8.0980E−01 | 1.3369E+00 | 1.1736E+00 | 6.3136E−01 |
| A8 = | −2.6686E+00 | −3.7155E+00 | −1.1972E+00 | −5.6327E−01 | −5.1004E−01 |
| A10 = | 6.8624E+00 | 6.4838E+00 | 4.3702E+00 | −4.2485E−01 | 1.7326E−01 |
| A12 = | −7.6620E+00 | −3.9597E+00 | −4.0503E+00 | 6.2189E−01 | 1.2064E−02 |
| A14 = | — | −4.7878E−01 | — | −3.3483E−01 | −2.3855E−02 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 1.69 | CT4/CT5 | 3.00 |
| Fno | 2.05 | CT4/ΣAT | 2.25 |
| HFOV [deg.] | 37.5 | |f/f2| + |f/f3| | 0.50 |
| V2 + V3 | 46.6 | f2/f3 | 2.08 |
| T23/T34 | 2.55 | f/R9 | 1.22 |
| CT4/(CT2 + CT3) | 1.51 | TL/ImgH | 2.25 |

11th Embodiment

Figure 21:
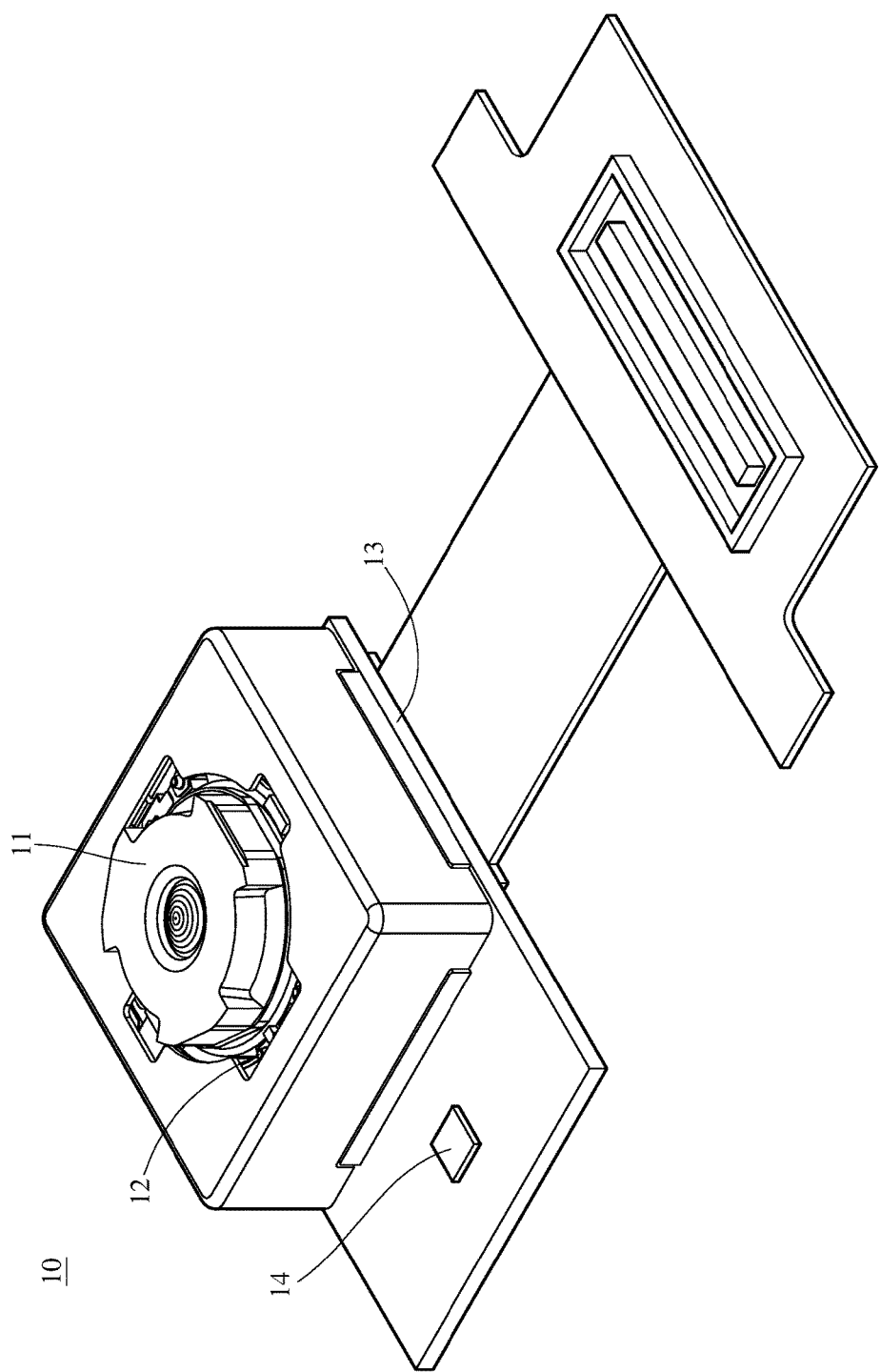
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the optical photographing lens assembly disclosed in the first embodiment, a barrel and a holder member (their reference numerals are omitted) for holding the optical photographing lens assembly. The external light converges into the lens unit 11 of the image capturing unit 10 to generate an image, and the lens unit 11 along with the driving device 12 is utilized for image focusing on the image sensor 13, and the image is able to be digitally transmitted to an electronic component.

The driving device 12 can have auto focusing functionality, and different driving configurations can be through the use of voice coil motors (VCM), micro electro-mechanical systems (MEMS), piezoelectric systems, or shape memory alloy materials. The driving device 12 is favorable for the lens unit 11 to obtain a better imaging position, so that a clear image of the imaged object can be captured by the lens unit 11 with different object distances. The image sensor 13 (for example, CCD or CMOS) can be featured with high photosensitivity and low noise, and can be disposed on the image surface of the optical photographing lens assembly to provide higher image quality.

The image stabilizer 14, such as an accelerometer, a gyroscope and a hall sensor, is configured to work with the driving device 12 to provide optical image stabilization (OIS). The driving device 12 working with the dynamic sensing element 26 is favorable for compensating for pan and tilt of the lens unit 11 to reduce blurring associated with motion during exposure. In some cases, the driving device 12 can be can be assisted by electronic image stabilization (EIS) with image processing software, thereby improving image quality while in motion or low-light condition.

12th Embodiment

Figure 22:
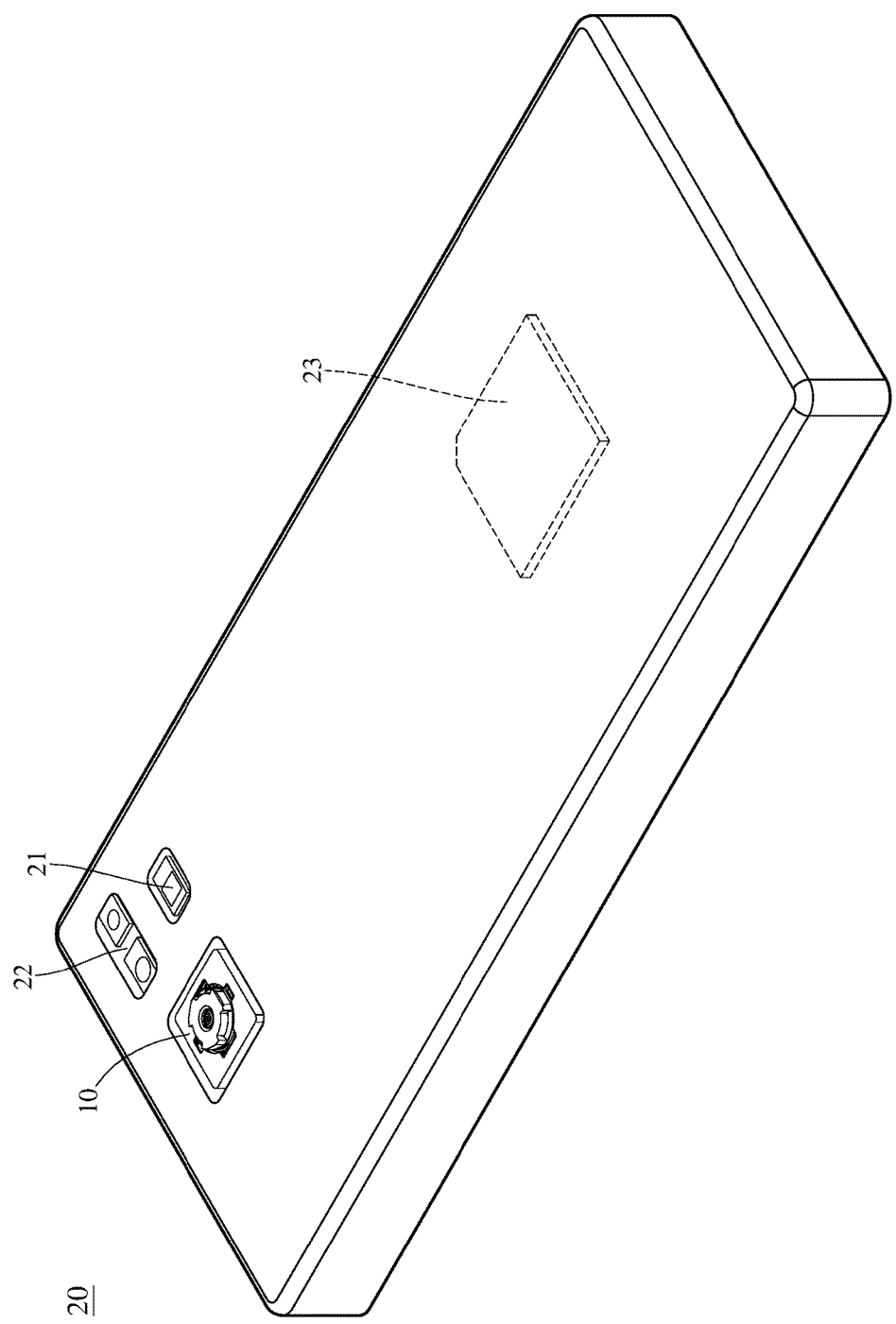
FIG. 22 is a perspective view of an electronic device according to the 12th embodiment of the present disclosure.
Figure 23:
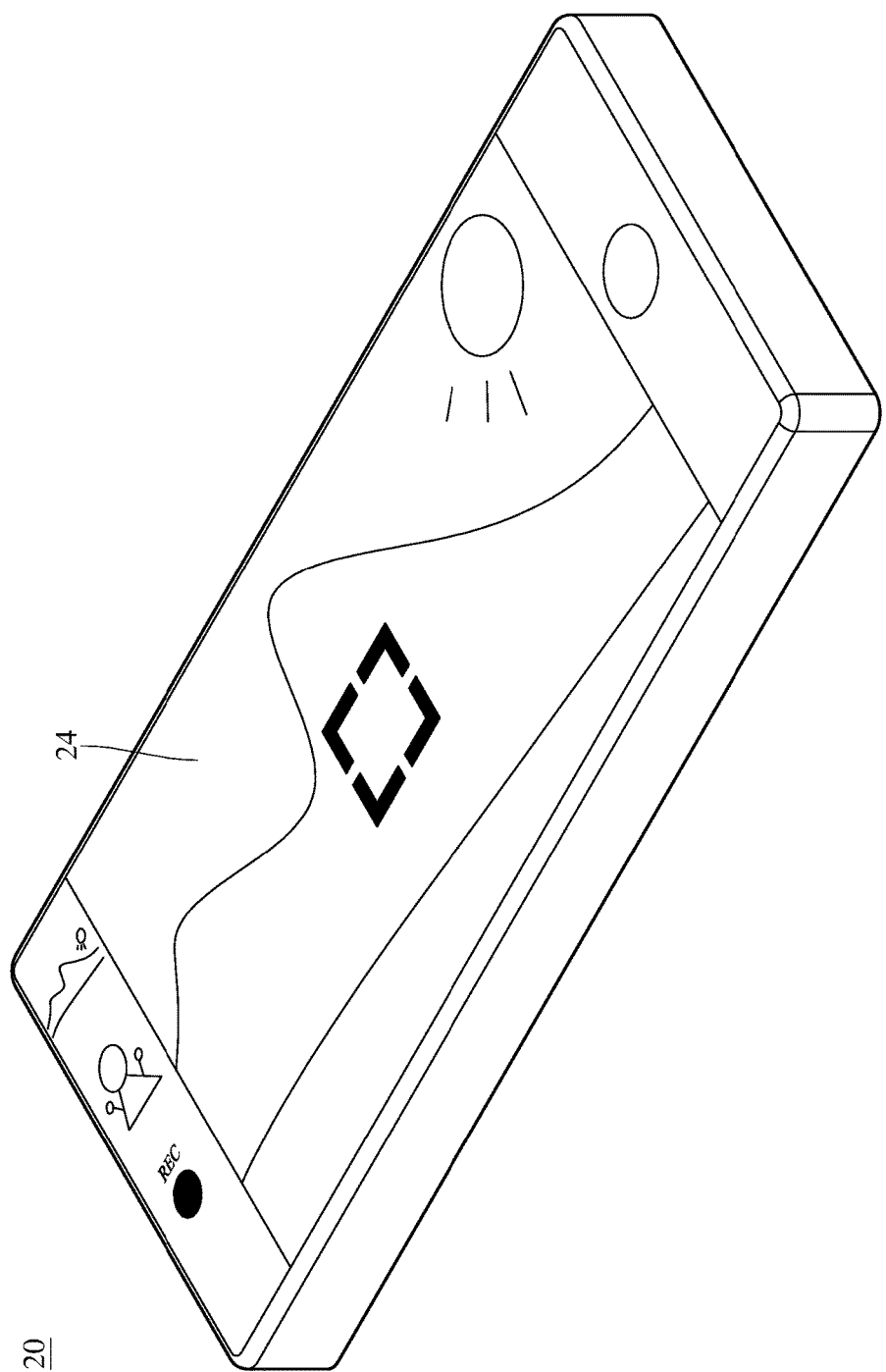
FIG. 23 is another perspective view of the electronic device in FIG. 22.
Figure 24:
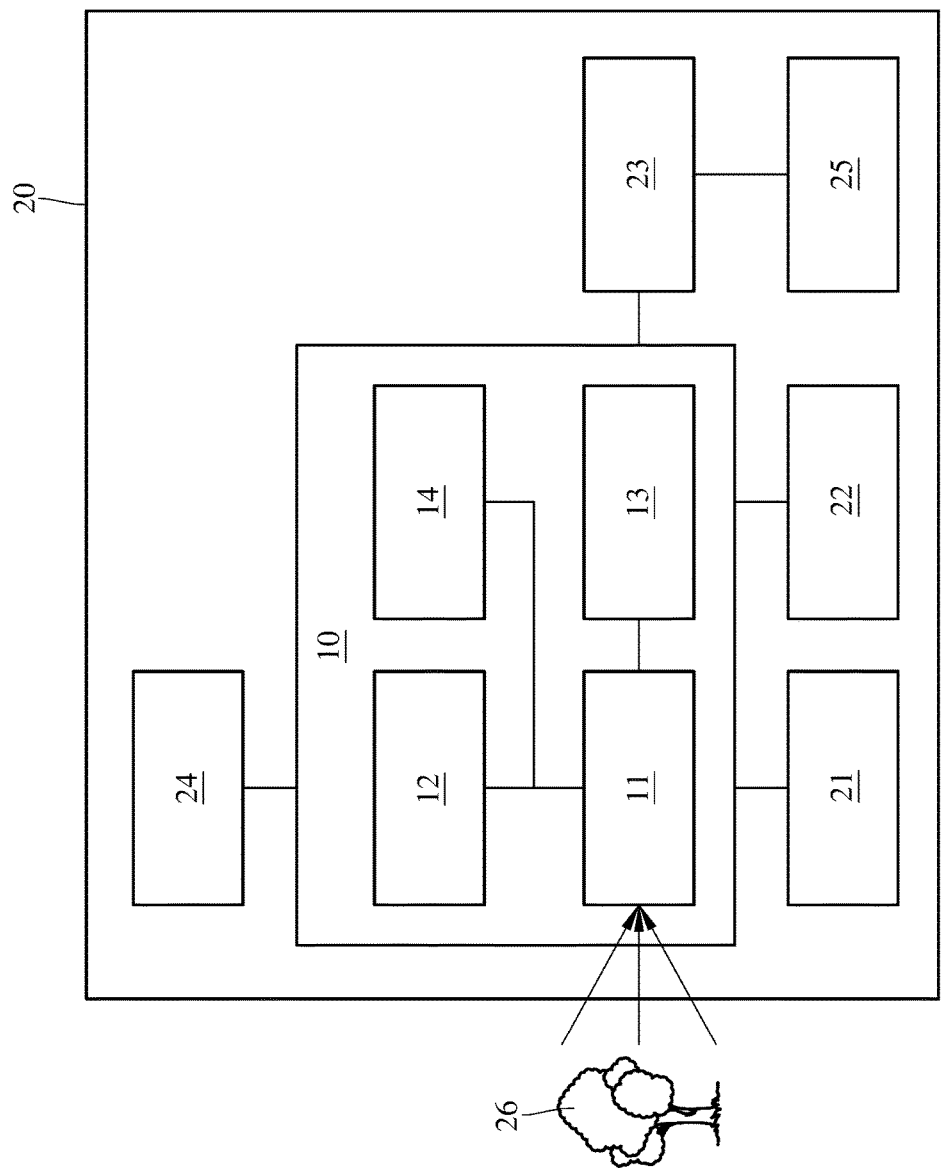
FIG. 24 is a block diagram of the electronic device in FIG. 22.

FIG. 22 is a perspective view of an electronic device according to the 12th embodiment of the present disclosure. FIG. 23 is another perspective view of the electronic device in FIG. 22. FIG. 24 is a block diagram of the electronic device in FIG. 22. In this embodiment, an electronic device 20 is a smartphone including the image capturing unit 10 disclosed in the eleventh embodiment, a flash module 21, a focus assist module 22, an image signal processor 23, an user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 further includes another different image capturing unit.

When a user interacts with the user interface 24 to capture the images of an object 26, the light rays converge into the image capturing unit 10 to generate image, and the flash module 21 is activated for light supplement. The focus assist module 22 detects the object distance of the imaged object to achieve fast image auto focus. The image signal processor 23 is configured to optimize the captured image to improve image quality. The light beam emitted from focus assist module 22 can be either infrared light or laser. The user interface 24 can be a touch screen or a shutter button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical photographing lens assembly of the image capturing unit 10 is featured with good capability in aberration corrections and high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising five lens elements, the five lens elements being, in order from an object side to an image side:

a first lens element with positive refractive power having an object-side surface being convex in a paraxial region thereof;

a second lens element with negative refractive power having an object-side surface being convex in a paraxial region thereof and an image-side surface being concave in a paraxial region thereof;

a third lens element;

a fourth lens element with positive refractive power having an image-side surface being convex in a paraxial region thereof; and a fifth lens element with negative refractive power having an image-side surface being concave in a paraxial region thereof, wherein the image-side surface of the fifth lens element has at least one convex critical point in an off-axial region thereof, and an object-side surface and the image-side surface of the fifth lens element are both aspheric;

wherein a central thickness of the fourth lens element is CT4, a central thickness of the fifth lens element is CT5, a sum of axial distances between each of the five adjacent lens elements of the optical photographing lens assembly is ΣAT, a focal length of the optical photographing lens assembly is f, a focal length of the second lens element is f2, a focal length of the third lens element is f3, and the following conditions are satisfied:

$$1.40 < CT4/\Sigma AT;$$

$$|f/f2| + |f/f3| < 0.80; \text{ and}$$

$$CT4/CT5 < 2.0.$$

2. The optical photographing lens assembly of claim 1, wherein the first lens element has an image-side surface being concave in a paraxial region thereof, and the third lens element has negative refractive power.

3. The optical photographing lens assembly of claim 1, wherein the fourth lens element has an object-side surface being concave in a paraxial region thereof.

4. The optical photographing lens assembly of claim 1, wherein an axial distance between the second lens element and the third lens element is T23, an axial distance between the third lens element and the fourth lens element is T34, and the following condition is satisfied:

$$1.0 < T23/T34 < 4.0.$$

5. The optical photographing lens assembly of claim 1, wherein the focal length of the second lens element is f2, the focal length of the third lens element is f3, and the following condition is satisfied:

$$-0.40 < f2/f3 < 2.5.$$

6. The optical photographing lens assembly of claim 5, wherein the focal length of the second lens element is f2, the focal length of the third lens element is f3, and the following condition is satisfied:

$$0.40 < f2/f3 < 2.0.$$

7. The optical photographing lens assembly of claim 1, wherein the focal length of the optical photographing lens assembly is f, a curvature radius of the object-side surface of the fifth lens element is R9, and the following condition is satisfied:

$$-1.0 < f/R9 < 0.50.$$

8. The optical photographing lens assembly of claim 1, wherein the object-side surface of the second lens element has at least one concave critical point in an off-axial region thereof.

9. The optical photographing lens assembly of claim 1, wherein an Abbe number of the second lens element is V2, an Abbe number of the third lens element is V3, an axial distance between the object-side surface of the first lens element and an image surface is TL, a maximum image height of the optical photographing lens assembly is ImgH, and the following conditions are satisfied:

$V2+V3<60$; and $TL/\mathrm{Img}H<2.50.$

10. The optical photographing lens assembly of claim 1, wherein the third lens element has an image-side surface being concave in a paraxial region thereof, the image-side surface of the third lens element has at least one convex critical point in an off-axial region thereof, and an object-side surface and the image-side surface of the third lens element are both aspheric.

11. The optical photographing lens assembly of claim 1, wherein a central thickness of the second lens element is CT2, a central thickness of the third lens element is CT3, the central thickness of the fourth lens element is CT4, and the following condition is satisfied:

$1.75<CT4/(CT2+CT3)<3.50.$

12. The optical photographing lens assembly of claim 1, wherein the first lens element has an image-side surface being concave in a paraxial region thereof, and the image-side surface of the first lens element has at least one convex critical point in an off-axial region thereof.

13. An image capturing unit, comprising:
the optical photographing lens assembly of claim 1; and
an image sensor disposed on an image surface of the optical photographing lens assembly.

14. An electronic device, comprising:
the image capturing unit of claim 13.

15. An optical photographing lens assembly comprising five lens elements, the five lens elements being, in order from an object side to an image side:
a first lens element with positive refractive power having an object-side surface being convex in a paraxial region thereof;
a second lens element with negative refractive power having an object-side surface being convex in a paraxial region thereof and an image-side surface being concave in a paraxial region thereof;
a third lens element;
a fourth lens element with positive refractive power having an image-side surface being convex in a paraxial region thereof; and
a fifth lens element with negative refractive power having an image-side surface being concave in a paraxial region thereof, wherein the image-side surface of the fifth lens element has at least one convex critical point in an off-axial region thereof, and an object-side surface and the image-side surface of the fifth lens element are both aspheric;
wherein a central thickness of the fourth lens element is CT4, a sum of axial distances between each of the five adjacent lens elements of the optical photographing lens assembly is ΣAT, a focal length of the optical photographing lens assembly is f, a focal length of the second lens element is f2, a focal length of the third lens element is f3, a curvature radius of the object-side surface of the fifth lens element is R9, and the following conditions are satisfied:

$1.40<CT4/\Sigma AT;$ $|f/f2|+|f/f3|<0.55;$ and $f/R9<1.50.$

16. The optical photographing lens assembly of claim 15, wherein the focal length of the optical photographing lens assembly is f, the curvature radius of the object-side surface of the fifth lens element is R9, and the following condition is satisfied:

$-1.0<f/R9<0.50.$

17. The optical photographing lens assembly of claim 15, wherein the focal length of the second lens element is f2, the focal length of the third lens element is f3, and the following condition is satisfied:

$0.40<f2/f3<2.0.$

18. The optical photographing lens assembly of claim 15, wherein the third lens element has an image-side surface being concave in a paraxial region thereof, the image-side surface of the third lens element has at least one convex critical point in an off-axial region thereof, and an object-side surface and the image-side surface of the third lens element are both aspheric.

19. The optical photographing lens assembly of claim 15, wherein an Abbe number of the second lens element is V2, an Abbe number of the third lens element is V3, an axial distance between the object-side surface of the first lens element and an image surface is TL, a maximum image height of the optical photographing lens assembly is ImgH, and the following conditions are satisfied:

$V2+V3<60;$ and $TL/\mathrm{Img}H<2.50.$

20. The optical photographing lens assembly of claim 15, wherein an axial distance between the second lens element and the third lens element is T23, an axial distance between the third lens element and the fourth lens element is T34, and the following condition is satisfied:

$1.0<T23/T34<4.0.$

21. The optical photographing lens assembly of claim 20, wherein the axial distance between the second lens element and the third lens element is T23, the axial distance between the third lens element and the fourth lens element is T34, and the following condition is satisfied:

$1.0<T23/T34<3.5.$

22. The optical photographing lens assembly of claim 15, wherein a central thickness of the second lens element is CT2, a central thickness of the third lens element is CT3, the central thickness of the fourth lens element is CT4, and the following condition is satisfied:

$1.75<CT4/(CT2+CT3)<3.50.$

23. The optical photographing lens assembly of claim 15, wherein the object-side surface of the second lens element has at least one concave critical point in an off-axial region thereof.

24. The optical photographing lens assembly of claim 15, wherein the first lens element has an image-side surface being concave in a paraxial region thereof, and the image-side surface of the first lens element has at least one convex critical point in an off-axial region thereof.

\* \* \* \* \*